US009185449B2

United States Patent
Ellis et al.

(10) Patent No.: US 9,185,449 B2
(45) Date of Patent: *Nov. 10, 2015

(54) INTERACTIVE TELEVISION PROGRAM GUIDE SYSTEM HAVING MULTIPLE DEVICES WITHIN A HOUSEHOLD

(75) Inventors: Michael D. Ellis, Boulder, CO (US); William L. Thomas, Bixby, OK (US); Thomas R. Lemmons, Sand Springs, OK (US)

(73) Assignee: Rovi Guides, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/780,196

(22) Filed: May 14, 2010

(65) Prior Publication Data

US 2010/0251303 A1   Sep. 30, 2010

Related U.S. Application Data

(63) Continuation of application No. 11/894,618, filed on Aug. 20, 2007, which is a continuation of application No. 11/179,410, filed on Jul. 11, 2005, now abandoned, which is a continuation of application No. 09/356,161, filed on Jul. 16, 1999, now abandoned.

(60) Provisional application No. 60/093,292, filed on Jul. 17, 1998.

(51) Int. Cl.
  *G06F 3/00* (2006.01)
  *G06F 13/00* (2006.01)
  (Continued)

(52) U.S. Cl.
  CPC ....... *H04N 21/4227* (2013.01); *H04N 5/44543* (2013.01); *H04N 5/44582* (2013.01);
  (Continued)

(58) Field of Classification Search
  USPC .................................................. 725/47, 61
  See application file for complete search history.

(56) References Cited

U.S. PATENT DOCUMENTS

| 4,264,924 A | 4/1981 | Freeman |
| 4,264,925 A | 4/1981 | Freeman et al. |

(Continued)

FOREIGN PATENT DOCUMENTS

| CA | 2764753 | 6/1998 |
| DE | 3151492 | 7/1983 |

(Continued)

OTHER PUBLICATIONS

Submission by Velocity in European Pat. No. 1099341 (Mar. 19, 2010).

(Continued)

*Primary Examiner* — Jonathan V Lewis
(74) *Attorney, Agent, or Firm* — Ropes & Gray LLP

(57) ABSTRACT

An interactive television program guide system based on multiple user television equipment devices in a single household is provided. The system provides a user with an opportunity to adjust program guide settings with a given one of the interactive television program guides. The system coordinates the operation of the interactive television program guides so that the program guide settings that were adjusted with the given interactive television program guide are used by the other interactive television program guides. Program guide setting include features related to setting program reminders, profiles, program recording features, messaging features, favorites features, parental control features, program guide set up features (e.g., audio and video and language settings); etc. The operation of applications such as web browser applications; home shopping applications, home banking applications, game applications, etc. may also be coordinated.

36 Claims, 38 Drawing Sheets

(51) Int. Cl.

| | | |
|---|---|---|
| *H04N 5/445* | (2011.01) | |
| *H04N 21/4227* | (2011.01) | |
| *H04N 7/10* | (2006.01) | |
| *H04N 7/16* | (2011.01) | |
| *H04N 7/173* | (2011.01) | |
| *H04N 21/436* | (2011.01) | |
| *H04N 21/442* | (2011.01) | |
| *H04N 21/45* | (2011.01) | |
| *H04N 21/472* | (2011.01) | |
| *H04N 21/475* | (2011.01) | |
| *H04N 21/478* | (2011.01) | |
| *H04N 21/4782* | (2011.01) | |
| *H04N 21/4786* | (2011.01) | |
| *H04N 21/4788* | (2011.01) | |
| *H04N 21/482* | (2011.01) | |
| *H04N 21/488* | (2011.01) | |
| *H04N 21/485* | (2011.01) | |
| *H04N 5/44* | (2011.01) | |

(52) U.S. Cl.
CPC .............. *H04N7/106* (2013.01); *H04N 7/163* (2013.01); *H04N 7/17318* (2013.01); *H04N 21/43615* (2013.01); *H04N 21/44222* (2013.01); *H04N 21/4532* (2013.01); *H04N 21/4751* (2013.01); *H04N 21/4753* (2013.01); *H04N 21/4755* (2013.01); *H04N 21/4782* (2013.01); *H04N 21/4786* (2013.01); *H04N 21/4788* (2013.01); *H04N 21/47214* (2013.01); *H04N 21/47815* (2013.01); *H04N 21/482* (2013.01); *H04N 21/4821* (2013.01); *H04N 21/4882* (2013.01); *H04N 21/485* (2013.01); *H04N 21/4856* (2013.01); *H04N 2005/4433* (2013.01)

(56) References Cited

U.S. PATENT DOCUMENTS

| | | |
|---|---|---|
| 4,355,415 A | 10/1982 | George et al. |
| 4,422,105 A | 12/1983 | Rodesch et al. |
| 4,429,385 A | 1/1984 | Cichelli et al. |
| 4,488,179 A | 12/1984 | Krüger et al. |
| 4,573,072 A | 2/1986 | Freeman |
| 4,602,279 A | 7/1986 | Freeman |
| 4,605,964 A | 8/1986 | Chard |
| 4,625,080 A | 11/1986 | Scott |
| 4,630,108 A | 12/1986 | Gomersall |
| 4,694,490 A | 9/1987 | Harvey et al. |
| 4,706,121 A | 11/1987 | Young |
| 4,718,107 A | 1/1988 | Hayes |
| 4,751,578 A | 6/1988 | Reiter et al. |
| 4,761,684 A | 8/1988 | Clark et al. |
| 4,787,063 A | 11/1988 | Muguet et al. |
| 4,802,022 A | 1/1989 | Harada |
| 4,841,562 A | 6/1989 | Lem |
| 4,847,698 A | 7/1989 | Freeman |
| 4,847,700 A | 7/1989 | Freeman |
| 4,857,999 A | 8/1989 | Welsh |
| 4,866,434 A | 9/1989 | Keenan |
| 4,899,370 A | 2/1990 | Kameo et al. |
| 4,908,707 A | 3/1990 | Kinghorn |
| 4,920,432 A | 4/1990 | Eggers et al. |
| 4,930,158 A | 5/1990 | Vogel |
| 4,945,563 A | 7/1990 | Horton et al. |
| 4,947,244 A | 8/1990 | Fenwick et al. |
| 4,959,720 A | 9/1990 | Duffield et al. |
| 4,965,825 A | 10/1990 | Harvey et al. |
| 4,977,455 A | 12/1990 | Young |
| 4,994,908 A | 2/1991 | Kuban et al. |
| 5,001,554 A | 3/1991 | Johnson et al. |
| 5,016,273 A | 5/1991 | Hoff |
| 5,036,314 A | 7/1991 | Barillari et al. |
| 5,038,211 A | 8/1991 | Hallenbeck |
| 5,047,867 A | 9/1991 | Strubbe et al. |
| 5,068,733 A | 11/1991 | Bennett |
| 5,086,385 A | 2/1992 | Launey et al. |
| 5,089,885 A | 2/1992 | Clark |
| 5,105,184 A | 4/1992 | Pirani et al. |
| 5,109,279 A | 4/1992 | Ando |
| 5,113,259 A | 5/1992 | Romesburg et al. |
| 5,123,046 A | 6/1992 | Levine |
| 5,132,992 A | 7/1992 | Yurt et al. |
| 5,134,649 A | 7/1992 | Gutzmer |
| 5,134,719 A | 7/1992 | Mankovitz |
| 5,151,789 A | 9/1992 | Young |
| 5,155,591 A | 10/1992 | Wachob |
| 5,168,353 A | 12/1992 | Walker et al. |
| 5,172,413 A | 12/1992 | Bradley et al. |
| 5,179,439 A | 1/1993 | Hashimoto |
| 5,187,589 A | 2/1993 | Kono et al. |
| 5,195,134 A | 3/1993 | Inoue et al. |
| 5,200,822 A | 4/1993 | Bronfin et al. |
| 5,202,915 A | 4/1993 | Nishii |
| 5,210,611 A | 5/1993 | Yee et al. |
| 5,216,228 A | 6/1993 | Hashimoto |
| 5,223,924 A | 6/1993 | Strubbe |
| 5,225,902 A | 7/1993 | McMullan, Jr. |
| 5,228,077 A | 7/1993 | Darbee |
| 5,233,423 A | 8/1993 | Jernigan et al. |
| 5,239,654 A | 8/1993 | Ing-Simmons et al. |
| 5,241,428 A | 8/1993 | Goldwasser et al. |
| 5,249,043 A | 9/1993 | Grandmougin et al. |
| 5,253,066 A | 10/1993 | Vogel |
| 5,253,275 A | 10/1993 | Yurt et al. |
| 5,283,560 A | 2/1994 | Bartlett |
| 5,285,284 A | 2/1994 | Takashima et al. |
| 5,296,931 A | 3/1994 | Na et al. |
| 5,307,173 A | 4/1994 | Yuen et al. |
| 5,319,445 A | 6/1994 | Fitts |
| 5,323,234 A | 6/1994 | Kawasaki et al. |
| 5,325,183 A | 6/1994 | Rhee et al. |
| 5,335,079 A | 8/1994 | Yuen et al. |
| 5,335,277 A | 8/1994 | Harvey et al. |
| 5,353,121 A | 10/1994 | Young et al. |
| 5,359,367 A | 10/1994 | Stockill et al. |
| 5,371,551 A | 12/1994 | Logan et al. |
| 5,377,317 A | 12/1994 | Bates et al. |
| 5,382,983 A | 1/1995 | Kwoh et al. |
| 5,398,074 A | 3/1995 | Duffield et al. |
| 5,410,326 A | 4/1995 | Goldstein |
| 5,410,344 A | 4/1995 | Graves et al. |
| 5,412,720 A | 5/1995 | Hoarty |
| 5,414,756 A | 5/1995 | Levine |
| 5,416,508 A | 5/1995 | Sakuma et al. |
| 5,418,622 A | 5/1995 | Takeuchi |
| 5,440,678 A | 8/1995 | Eisen et al. |
| 5,442,389 A | 8/1995 | Blahut et al. |
| 5,455,570 A | 10/1995 | Cook et al. |
| 5,459,522 A | 10/1995 | Pint |
| 5,465,113 A | 11/1995 | Gilboy |
| 5,467,264 A | 11/1995 | Rauch et al. |
| 5,469,206 A | 11/1995 | Strubbe et al. |
| 5,477,262 A | 12/1995 | Banker et al. |
| 5,479,266 A | 12/1995 | Young et al. |
| 5,479,268 A | 12/1995 | Young et al. |
| 5,479,497 A | 12/1995 | Kovarik |
| 5,481,296 A | 1/1996 | Cragun et al. |
| 5,483,278 A | 1/1996 | Strubbe et al. |
| 5,485,197 A | 1/1996 | Hoarty |
| 5,485,219 A | 1/1996 | Woo et al. |
| 5,485,221 A | 1/1996 | Banker et al. |
| 5,488,409 A | 1/1996 | Yuen et al. |
| 5,502,504 A | 3/1996 | Marshall et al. |
| 5,517,256 A | 5/1996 | Hashimoto |
| 5,517,257 A | 5/1996 | Dunn et al. |
| 5,523,796 A | 6/1996 | Marshall et al. |
| 5,524,195 A | 6/1996 | Clanton, III et al. |
| 5,526,034 A | 6/1996 | Hoarty et al. |
| 5,528,304 A | 6/1996 | Cherrick et al. |
| 5,532,754 A | 7/1996 | Young et al. |
| 5,534,911 A | 7/1996 | Levitan |

(56) References Cited

U.S. PATENT DOCUMENTS

| | | | |
|---|---|---|---|
| 5,537,141 A | 7/1996 | Harper et al. | |
| 5,539,449 A | 7/1996 | Blahut et al. | |
| 5,539,822 A | 7/1996 | Lett | |
| 5,541,662 A | 7/1996 | Adams et al. | |
| 5,543,856 A | 8/1996 | Rosser et al. | |
| 5,548,345 A | 8/1996 | Brian et al. | |
| 5,550,575 A | 8/1996 | West et al. | |
| 5,550,576 A | 8/1996 | Klosterman | |
| 5,550,863 A | 8/1996 | Yurt et al. | |
| 5,553,123 A | 9/1996 | Chan et al. | |
| 5,557,338 A | 9/1996 | Maze et al. | |
| 5,557,724 A | 9/1996 | Sampat et al. | |
| 5,559,548 A | 9/1996 | Davis et al. | |
| 5,559,549 A | 9/1996 | Hendricks et al. | |
| 5,559,550 A | 9/1996 | Mankovitz | |
| 5,568,272 A | 10/1996 | Levine | |
| 5,570,295 A | 10/1996 | Isenberg et al. | |
| 5,570,415 A | 10/1996 | Stretton et al. | |
| 5,572,442 A | 11/1996 | Schulhof et al. | |
| 5,574,965 A | 11/1996 | Welmer | |
| 5,576,755 A | 11/1996 | Davis et al. | |
| 5,579,239 A | 11/1996 | Freeman et al. | |
| 5,583,560 A | 12/1996 | Florin et al. | |
| 5,583,561 A | 12/1996 | Baker et al. | |
| 5,583,563 A | 12/1996 | Wanderscheid et al. | |
| 5,583,653 A | 12/1996 | Timmermans et al. | |
| 5,585,838 A | 12/1996 | Lawler et al. | |
| 5,585,858 A | 12/1996 | Harper et al. | |
| 5,585,865 A | 12/1996 | Amano et al. | |
| 5,585,866 A | 12/1996 | Miller et al. | |
| 5,589,892 A | 12/1996 | Knee et al. | |
| 5,592,482 A | 1/1997 | Abraham | |
| 5,592,551 A | 1/1997 | Lett et al. | |
| 5,594,509 A | 1/1997 | Florin et al. | |
| 5,596,373 A | 1/1997 | White et al. | |
| 5,600,364 A | 2/1997 | Hendricks et al. | |
| 5,602,582 A | 2/1997 | Wanderscheid et al. | |
| 5,606,374 A | 2/1997 | Bertram | |
| 5,606,726 A | 2/1997 | Yoshinobu | |
| 5,610,653 A | 3/1997 | Abecassis | |
| 5,617,526 A | 4/1997 | Oran et al. | |
| 5,619,247 A | 4/1997 | Russo | |
| 5,619,249 A | 4/1997 | Billock et al. | |
| 5,619,274 A | 4/1997 | Roop et al. | |
| 5,621,456 A | 4/1997 | Florin et al. | |
| 5,623,613 A | 4/1997 | Rowe et al. | |
| 5,625,406 A | 4/1997 | Newberry et al. | |
| 5,625,464 A | 4/1997 | Compoint et al. | |
| 5,629,733 A | 5/1997 | Youman et al. | |
| 5,630,067 A | 5/1997 | Kindell et al. | |
| 5,630,119 A | 5/1997 | Aristides et al. | |
| 5,631,995 A | 5/1997 | Weissensteiner et al. | |
| 5,632,007 A | 5/1997 | Freeman | |
| 5,635,978 A | 6/1997 | Alten et al. | |
| 5,635,979 A | 6/1997 | Kostreski et al. | |
| 5,635,989 A | 6/1997 | Rothmuller | |
| 5,640,484 A | 6/1997 | Mankovitz | |
| 5,644,354 A | 7/1997 | Thompson et al. | |
| 5,646,603 A | 7/1997 | Nagata et al. | |
| 5,648,813 A | 7/1997 | Tanigawa et al. | |
| 5,648,824 A | 7/1997 | Dunn et al. | |
| 5,650,826 A | 7/1997 | Eitz | |
| 5,650,831 A | 7/1997 | Farwell | |
| 5,652,613 A | 7/1997 | Lazarus et al. | |
| 5,652,615 A | 7/1997 | Bryant et al. | |
| 5,654,748 A | 8/1997 | Matthews, III | |
| 5,654,886 A | 8/1997 | Zereski, Jr. et al. | |
| 5,655,214 A | 8/1997 | Mullett | |
| 5,657,072 A | 8/1997 | Aristides et al. | |
| 5,657,414 A | 8/1997 | Lett et al. | |
| 5,659,350 A | 8/1997 | Hendricks et al. | |
| 5,659,367 A | 8/1997 | Yuen | |
| 5,661,516 A | 8/1997 | Carles | |
| 5,666,293 A | 9/1997 | Metz et al. | |
| 5,666,498 A | 9/1997 | Amro | |
| 5,666,645 A | 9/1997 | Thomas et al. | |
| 5,675,390 A | 10/1997 | Schindler et al. | |
| 5,682,206 A | 10/1997 | Wehmeyer et al. | |
| 5,684,525 A | 11/1997 | Klosterman | |
| 5,686,954 A | 11/1997 | Yoshinobu et al. | |
| 5,689,666 A | 11/1997 | Berquist et al. | |
| 5,692,214 A * | 11/1997 | Levine | 710/13 |
| 5,694,163 A | 12/1997 | Harrison | |
| 5,694,381 A | 12/1997 | Sako et al. | |
| 5,696,695 A | 12/1997 | Ehlers et al. | |
| 5,696,824 A | 12/1997 | Walsh | |
| 5,699,052 A | 12/1997 | Miyahara | |
| 5,699,107 A | 12/1997 | Lawler et al. | |
| 5,706,191 A | 1/1998 | Bassett et al. | |
| 5,710,601 A | 1/1998 | Marshall et al. | |
| 5,710,605 A | 1/1998 | Nelson | |
| 5,710,884 A | 1/1998 | Dedrick | |
| 5,715,020 A | 2/1998 | Kuroiwa et al. | |
| 5,717,452 A | 2/1998 | Janin et al. | |
| 5,724,091 A | 3/1998 | Freeman et al. | |
| 5,727,060 A | 3/1998 | Young | |
| 5,734,720 A | 3/1998 | Salganicoff | |
| 5,734,853 A | 3/1998 | Hendricks et al. | |
| 5,734,893 A | 3/1998 | Li et al. | |
| 5,742,905 A | 4/1998 | Pepe et al. | |
| 5,745,710 A | 4/1998 | Clanton, III et al. | |
| 5,748,191 A | 5/1998 | Rozak et al. | |
| 5,748,716 A | 5/1998 | Levine | |
| 5,748,732 A | 5/1998 | Le Berre et al. | |
| 5,751,282 A | 5/1998 | Girard et al. | |
| 5,752,159 A | 5/1998 | Faust et al. | |
| 5,754,771 A | 5/1998 | Epperson et al. | |
| 5,754,938 A | 5/1998 | Herz et al. | |
| 5,758,257 A | 5/1998 | Herz et al. | |
| 5,758,259 A | 5/1998 | Lawler | |
| 5,760,821 A | 6/1998 | Ellis et al. | |
| 5,760,917 A | 6/1998 | Sheridan | |
| 5,761,662 A | 6/1998 | Dasan | |
| 5,768,528 A | 6/1998 | Stumm | |
| 5,771,275 A | 6/1998 | Brunner et al. | |
| 5,774,539 A | 6/1998 | Maass et al. | |
| 5,774,664 A | 6/1998 | Hidary et al. | |
| 5,774,666 A | 6/1998 | Portuesi | |
| 5,774,859 A | 6/1998 | Houser et al. | |
| 5,778,182 A | 7/1998 | Cathey et al. | |
| 5,781,226 A | 7/1998 | Sheehan | |
| 5,781,246 A | 7/1998 | Alten et al. | |
| 5,787,259 A | 7/1998 | Haroun et al. | |
| 5,788,507 A | 8/1998 | Redford et al. | |
| 5,790,198 A | 8/1998 | Roop et al. | |
| 5,790,202 A | 8/1998 | Kummer et al. | |
| 5,790,935 A | 8/1998 | Payton | |
| 5,793,438 A * | 8/1998 | Bedard | 725/43 |
| 5,793,964 A | 8/1998 | Rogers et al. | |
| 5,796,952 A | 8/1998 | Davis et al. | |
| 5,798,785 A | 8/1998 | Hendricks et al. | |
| 5,801,787 A | 9/1998 | Schein et al. | |
| 5,802,284 A | 9/1998 | Karlton et al. | |
| 5,805,155 A | 9/1998 | Allibhoy et al. | |
| 5,805,204 A | 9/1998 | Thompson et al. | |
| 5,805,763 A | 9/1998 | Lawler et al. | |
| 5,805,804 A | 9/1998 | Laursen et al. | |
| 5,805,806 A | 9/1998 | McArthur | |
| 5,808,608 A | 9/1998 | Young et al. | |
| 5,808,694 A | 9/1998 | Usui et al. | |
| 5,809,204 A | 9/1998 | Young et al. | |
| 5,812,123 A | 9/1998 | Rowe et al. | |
| 5,812,205 A | 9/1998 | Milnes et al. | |
| 5,812,930 A | 9/1998 | Zavrel | |
| 5,812,931 A | 9/1998 | Yuen | |
| 5,812,937 A | 9/1998 | Takahisa et al. | |
| 5,818,438 A | 10/1998 | Howe et al. | |
| 5,818,441 A | 10/1998 | Throckmorton et al. | |
| 5,819,019 A | 10/1998 | Nelson | |
| 5,819,156 A | 10/1998 | Belmont | |
| 5,822,123 A | 10/1998 | Davis et al. | |
| 5,822,606 A | 10/1998 | Morton | |
| 5,828,420 A | 10/1998 | Marshall et al. | |
| 5,828,945 A * | 10/1998 | Klosterman | 455/42 |

(56) References Cited

U.S. PATENT DOCUMENTS

| | | | |
|---|---|---|---|
| RE35,954 E | 11/1998 | Levine | |
| 5,831,664 A * | 11/1998 | Wharton et al. | 725/81 |
| 5,838,314 A | 11/1998 | Neel et al. | |
| 5,844,620 A | 12/1998 | Coleman et al. | |
| 5,846,704 A | 12/1998 | Maertens et al. | |
| 5,850,218 A | 12/1998 | LaJoie et al. | |
| 5,852,437 A | 12/1998 | Wugofski et al. | |
| 5,861,881 A | 1/1999 | Freeman et al. | |
| 5,861,906 A | 1/1999 | Dunn et al. | |
| 5,864,704 A | 1/1999 | Battle et al. | |
| 5,864,823 A | 1/1999 | Levitan | |
| 5,867,223 A | 2/1999 | Schindler et al. | |
| 5,867,233 A | 2/1999 | Tanaka et al. | |
| 5,867,799 A | 2/1999 | Lang et al. | |
| 5,878,222 A | 3/1999 | Harrison | |
| 5,880,768 A | 3/1999 | Lemmons et al. | |
| 5,883,621 A | 3/1999 | Iwamura | |
| 5,884,298 A | 3/1999 | Smith, II et al. | |
| 5,886,732 A | 3/1999 | Humpleman | |
| 5,892,536 A | 4/1999 | Logan et al. | |
| 5,901,366 A | 5/1999 | Nakano et al. | |
| 5,907,322 A | 5/1999 | Kelly et al. | |
| 5,907,323 A | 5/1999 | Lawler et al. | |
| 5,909,212 A | 6/1999 | Nishina et al. | |
| 5,914,746 A | 6/1999 | Matthews, III et al. | |
| 5,915,068 A | 6/1999 | Levine | |
| 5,917,405 A | 6/1999 | Joao | |
| 5,926,624 A | 7/1999 | Katz et al. | |
| 5,929,849 A | 7/1999 | Kikinis | |
| 5,929,932 A * | 7/1999 | Otsuki et al. | 725/47 |
| 5,940,387 A | 8/1999 | Humpleman | |
| 5,940,572 A | 8/1999 | Balaban et al. | |
| 5,945,988 A | 8/1999 | Williams et al. | |
| 5,953,485 A | 9/1999 | Abecassis | |
| 5,956,025 A | 9/1999 | Goulden et al. | |
| 5,956,716 A | 9/1999 | Kenner et al. | |
| 5,959,592 A | 9/1999 | Petruzzelli | |
| 5,963,264 A | 10/1999 | Jackson | |
| 5,963,645 A | 10/1999 | Kigawa et al. | |
| 5,969,748 A | 10/1999 | Casement et al. | |
| 5,970,473 A | 10/1999 | Gerszberg et al. | |
| 5,973,683 A | 10/1999 | Cragun et al. | |
| 5,977,964 A | 11/1999 | Williams et al. | |
| 5,982,411 A | 11/1999 | Eyer et al. | |
| 5,987,509 A | 11/1999 | Portuesi | |
| 5,988,078 A | 11/1999 | Levine | |
| 5,990,884 A | 11/1999 | Douma et al. | |
| 5,990,885 A | 11/1999 | Gopinath | |
| 5,990,890 A | 11/1999 | Etheredge | |
| 5,991,799 A | 11/1999 | Yen et al. | |
| 5,991,832 A | 11/1999 | Sato et al. | |
| 6,002,394 A | 12/1999 | Schein et al. | |
| 6,002,450 A | 12/1999 | Darbee et al. | |
| 6,005,561 A | 12/1999 | Hawkins et al. | |
| 6,005,565 A | 12/1999 | Legall et al. | |
| 6,005,631 A | 12/1999 | Anderson et al. | |
| 6,006,257 A | 12/1999 | Slezak | |
| 6,009,153 A | 12/1999 | Houghton et al. | |
| 6,009,465 A | 12/1999 | Decker et al. | |
| 6,012,086 A | 1/2000 | Lowell | |
| 6,020,880 A | 2/2000 | Naimpally | |
| 6,020,883 A | 2/2000 | Herz et al. | |
| 6,025,837 A | 2/2000 | Matthews, III et al. | |
| 6,025,869 A | 2/2000 | Stas et al. | |
| 6,035,339 A | 3/2000 | Agraharam et al. | |
| 6,037,998 A * | 3/2000 | Usui et al. | 725/49 |
| 6,038,367 A | 3/2000 | Abecassis | |
| 6,040,829 A | 3/2000 | Croy et al. | |
| 6,049,823 A | 4/2000 | Hwang | |
| 6,055,314 A | 4/2000 | Spies et al. | |
| 6,057,872 A | 5/2000 | Candelore | |
| 6,057,890 A | 5/2000 | Virden et al. | |
| 6,058,238 A | 5/2000 | Ng | |
| 6,061,779 A | 5/2000 | Garde | |
| 6,064,980 A | 5/2000 | Jacobi et al. | |
| 6,067,564 A | 5/2000 | Urakoshi et al. | |
| 6,075,568 A | 6/2000 | Matsuura | |
| 6,091,884 A | 7/2000 | Yuen et al. | |
| 6,097,441 A | 8/2000 | Allport | |
| 6,104,334 A | 8/2000 | Allport | |
| 6,130,726 A | 10/2000 | Darbee et al. | |
| 6,133,847 A | 10/2000 | Yang | |
| 6,133,909 A | 10/2000 | Schein et al. | |
| 6,133,910 A | 10/2000 | Stinebruner | |
| 6,133,912 A | 10/2000 | Montero | |
| 6,141,488 A | 10/2000 | Knudson et al. | |
| 6,144,401 A | 11/2000 | Casement et al. | |
| 6,144,702 A | 11/2000 | Yurt et al. | |
| 6,157,411 A | 12/2000 | Williams et al. | |
| 6,157,413 A | 12/2000 | Hanafee et al. | |
| 6,160,988 A | 12/2000 | Shroyer | |
| 6,163,316 A | 12/2000 | Killian | |
| 6,167,188 A | 12/2000 | Young et al. | |
| 6,169,543 B1 | 1/2001 | Wehmeyer | |
| 6,172,674 B1 | 1/2001 | Etheredge | |
| 6,172,677 B1 | 1/2001 | Stautner et al. | |
| 6,177,931 B1 | 1/2001 | Alexander et al. | |
| 6,182,094 B1 | 1/2001 | Humpleman et al. | |
| 6,188,381 B1 | 2/2001 | van der Wal et al. | |
| 6,188,397 B1 | 2/2001 | Humpleman | |
| 6,192,340 B1 | 2/2001 | Abecassis | |
| 6,195,501 B1 * | 2/2001 | Perry et al. | 386/299 |
| 6,198,479 B1 | 3/2001 | Humpleman et al. | |
| 6,199,076 B1 | 3/2001 | Logan et al. | |
| 6,202,211 B1 | 3/2001 | Williams, Jr. | |
| 6,208,335 B1 | 3/2001 | Gordon et al. | |
| 6,208,384 B1 | 3/2001 | Schultheiss | |
| 6,208,799 B1 * | 3/2001 | Marsh et al. | 386/292 |
| 6,212,327 B1 | 4/2001 | Berstis et al. | |
| 6,219,839 B1 | 4/2001 | Sampsell | |
| 6,233,389 B1 | 5/2001 | Barton et al. | |
| 6,233,734 B1 | 5/2001 | Macrae et al. | |
| 6,236,978 B1 | 5/2001 | Tuzhilin | |
| 6,237,049 B1 | 5/2001 | Ludtke | |
| 6,239,794 B1 | 5/2001 | Yuen et al. | |
| 6,240,240 B1 | 5/2001 | Nagano et al. | |
| 6,240,555 B1 | 5/2001 | Shoff et al. | |
| 6,260,088 B1 | 7/2001 | Gove et al. | |
| 6,263,501 B1 | 7/2001 | Schein et al. | |
| 6,263,503 B1 * | 7/2001 | Margulis | 725/81 |
| 6,263,507 B1 | 7/2001 | Ahmad et al. | |
| 6,268,849 B1 | 7/2001 | Boyer et al. | |
| 6,275,648 B1 | 8/2001 | Knudson et al. | |
| 6,279,029 B1 | 8/2001 | Sampat et al. | |
| 6,286,142 B1 | 9/2001 | Ehreth | |
| 6,288,716 B1 | 9/2001 | Humpleman et al. | |
| 6,292,624 B1 | 9/2001 | Saib et al. | |
| 6,298,482 B1 | 10/2001 | Seidman et al. | |
| 6,305,018 B1 | 10/2001 | Usui et al. | |
| 6,310,886 B1 | 10/2001 | Barton | |
| 6,311,011 B1 | 10/2001 | Kuroda | |
| 6,317,881 B1 | 11/2001 | Shah-Nazaroff et al. | |
| 6,317,884 B1 | 11/2001 | Eames et al. | |
| 6,321,318 B1 | 11/2001 | Baltz et al. | |
| 6,324,338 B1 | 11/2001 | Wood et al. | |
| 6,326,982 B1 | 12/2001 | Wu et al. | |
| 6,327,418 B1 | 12/2001 | Barton | |
| 6,331,877 B1 | 12/2001 | Bennington et al. | |
| 6,336,099 B1 | 1/2002 | Barnett et al. | |
| 6,337,715 B1 * | 1/2002 | Inagaki et al. | 348/553 |
| 6,357,043 B1 | 3/2002 | Ellis et al. | |
| 6,367,080 B1 | 4/2002 | Enomoto et al. | |
| 6,374,406 B2 | 4/2002 | Hirata | |
| 6,388,714 B1 | 5/2002 | Schein et al. | |
| 6,389,464 B1 | 5/2002 | Krishnamurthy et al. | |
| 6,396,544 B1 | 5/2002 | Schindler et al. | |
| 6,397,080 B1 | 5/2002 | Viktorsson et al. | |
| 6,408,435 B1 | 6/2002 | Sato | |
| 6,425,000 B1 | 7/2002 | Carmello et al. | |
| 6,434,524 B1 | 8/2002 | Weber | |
| 6,437,836 B1 | 8/2002 | Huang et al. | |
| 6,442,332 B1 | 8/2002 | Knudson et al. | |
| 6,445,398 B1 | 9/2002 | Gerba et al. | |
| 6,463,585 B1 | 10/2002 | Hendricks et al. | |

(56) References Cited

U.S. PATENT DOCUMENTS

| | | |
|---|---|---|
| 6,473,559 B1 | 10/2002 | Knudson et al. |
| 6,480,889 B1 | 11/2002 | Saito et al. |
| 6,486,892 B1 | 11/2002 | Stern |
| 6,493,875 B1 | 12/2002 | Eames et al. |
| 6,505,348 B1 | 1/2003 | Knowles et al. |
| 6,509,908 B1 | 1/2003 | Croy et al. |
| 6,530,083 B1 | 3/2003 | Liebenow |
| 6,545,578 B2 | 4/2003 | Yoshiyama |
| 6,545,722 B1 | 4/2003 | Schultheiss et al. |
| 6,557,031 B1 | 4/2003 | Mimura et al. |
| 6,564,383 B1 | 5/2003 | Combs et al. |
| 6,571,279 B1 | 5/2003 | Herz et al. |
| 6,603,488 B2 | 8/2003 | Humpleman et al. |
| 6,611,654 B1 | 8/2003 | Shteyn |
| 6,622,304 B1 | 9/2003 | Carhart |
| 6,637,029 B1 | 10/2003 | Maissel et al. |
| 6,670,971 B1 | 12/2003 | Oral et al. |
| 6,675,385 B1 | 1/2004 | Wang |
| 6,678,004 B1 * | 1/2004 | Schultheiss et al. ........... 348/552 |
| 6,701,523 B1 | 3/2004 | Hancock et al. |
| 6,704,028 B2 | 3/2004 | Wugofski |
| 6,721,954 B1 | 4/2004 | Nickum |
| 6,727,914 B1 | 4/2004 | Gutta |
| 6,732,369 B1 | 5/2004 | Leftwich et al. |
| 6,732,372 B2 * | 5/2004 | Tomita et al. .................... 725/47 |
| 6,738,978 B1 | 5/2004 | Hendricks et al. |
| 6,744,967 B2 | 6/2004 | Kaminski et al. |
| 6,760,537 B2 | 7/2004 | Mankovitz |
| 6,772,433 B1 | 8/2004 | LaJoie et al. |
| 6,785,904 B1 * | 8/2004 | Franken et al. .................. 725/54 |
| 6,788,882 B1 * | 9/2004 | Geer et al. ...................... 386/116 |
| 6,816,172 B1 * | 11/2004 | Iki et al. ......................... 715/716 |
| 6,822,661 B2 | 11/2004 | Sai et al. |
| 6,847,686 B2 | 1/2005 | Morad et al. |
| 6,871,146 B1 | 3/2005 | Kelly et al. |
| 6,871,186 B1 | 3/2005 | Tuzhilin et al. |
| 6,882,299 B1 * | 4/2005 | Allport ........................ 341/176 |
| 6,925,567 B1 | 8/2005 | Hirata et al. |
| 6,927,806 B2 | 8/2005 | Chan |
| 6,934,964 B1 | 8/2005 | Schaffer et al. |
| 6,973,669 B2 | 12/2005 | Daniels |
| 7,003,606 B2 | 2/2006 | Fukushima et al. |
| 7,006,881 B1 * | 2/2006 | Hoffberg et al. ................. 700/83 |
| 7,013,339 B2 | 3/2006 | Schwager et al. |
| 7,017,171 B1 | 3/2006 | Horlander et al. |
| 7,051,353 B2 | 5/2006 | Yamashita et al. |
| 7,084,780 B2 | 8/2006 | Nguyen et al. |
| 7,096,486 B1 | 8/2006 | Ukai et al. |
| 7,117,518 B1 | 10/2006 | Takahashi et al. |
| 7,134,131 B1 | 11/2006 | Hendricks et al. |
| 7,152,236 B1 * | 12/2006 | Wugofski et al. ................ 725/40 |
| 7,194,755 B1 | 3/2007 | Nakata et al. |
| 7,224,886 B2 | 5/2007 | Akamatsu et al. |
| 7,328,450 B2 | 2/2008 | Macrae et al. |
| 7,343,614 B1 | 3/2008 | Hendricks et al. |
| 7,343,616 B1 | 3/2008 | Takahashi et al. |
| 7,403,693 B2 * | 7/2008 | Shteyn ........................... 386/291 |
| 7,480,929 B2 | 1/2009 | Klosterman et al. |
| 8,073,921 B2 | 12/2011 | Thomas et al. |
| 2001/0026533 A1 | 10/2001 | Schwager |
| 2002/0013941 A1 | 1/2002 | Ward, III et al. |
| 2002/0032907 A1 | 3/2002 | Daniels |
| 2002/0040475 A1 | 4/2002 | Yap et al. |
| 2002/0057892 A1 | 5/2002 | Mano et al. |
| 2002/0059599 A1 | 5/2002 | Schein et al. |
| 2002/0059610 A1 | 5/2002 | Ellis |
| 2002/0083455 A1 * | 6/2002 | Sato ................................ 725/58 |
| 2002/0090203 A1 | 7/2002 | Mankovitz |
| 2002/0095673 A1 | 7/2002 | Leung et al. |
| 2002/0100044 A1 * | 7/2002 | Daniels ........................... 725/39 |
| 2002/0100052 A1 | 7/2002 | Daniels |
| 2002/0118676 A1 | 8/2002 | Tonnby et al. |
| 2002/0129368 A1 | 9/2002 | Schlack et al. |
| 2002/0174424 A1 | 11/2002 | Chang et al. |
| 2002/0184626 A1 | 12/2002 | Darbee et al. |
| 2002/0194596 A1 | 12/2002 | Srivastava |
| 2003/0005445 A1 | 1/2003 | Schein et al. |
| 2003/0012555 A1 * | 1/2003 | Yuen et al. ....................... 386/83 |
| 2003/0031465 A1 | 2/2003 | Blake |
| 2003/0037336 A1 * | 2/2003 | Leftwich ......................... 725/91 |
| 2003/0040962 A1 | 2/2003 | Lewis |
| 2003/0066085 A1 * | 4/2003 | Boyer et al. .................. 725/104 |
| 2003/0079227 A1 | 4/2003 | Knowles et al. |
| 2003/0084461 A1 | 5/2003 | Hoang |
| 2003/0093329 A1 | 5/2003 | Gutta |
| 2003/0131356 A1 | 7/2003 | Proehl et al. |
| 2003/0142957 A1 * | 7/2003 | Young et al. ..................... 386/83 |
| 2003/0159157 A1 | 8/2003 | Chan |
| 2003/0163813 A1 | 8/2003 | Klosterman et al. |
| 2003/0164858 A1 | 9/2003 | Klosterman et al. |
| 2003/0188310 A1 | 10/2003 | Klosterman et al. |
| 2003/0188311 A1 | 10/2003 | Yuen et al. |
| 2003/0196201 A1 | 10/2003 | Schein et al. |
| 2003/0198462 A1 | 10/2003 | Bumgardner et al. |
| 2003/0208756 A1 | 11/2003 | Macrae et al. |
| 2003/0229900 A1 | 12/2003 | Reisman |
| 2004/0031050 A1 | 2/2004 | Klosterman |
| 2004/0078820 A1 | 4/2004 | Nickum |
| 2004/0098744 A1 | 5/2004 | Gutta |
| 2004/0103439 A1 | 5/2004 | Macrae et al. |
| 2004/0194138 A1 | 9/2004 | Boylan et al. |
| 2005/0015804 A1 | 1/2005 | LaJoie et al. |
| 2005/0028208 A1 | 2/2005 | Ellis et al. |
| 2005/0028218 A1 | 2/2005 | Blake |
| 2005/0120003 A1 | 6/2005 | Drury et al. |
| 2005/0193414 A1 | 9/2005 | Horvitz et al. |
| 2005/0240962 A1 | 10/2005 | Cooper et al. |
| 2005/0240968 A1 | 10/2005 | Knudson et al. |
| 2005/0251822 A1 | 11/2005 | Knowles et al. |
| 2005/0251827 A1 | 11/2005 | Ellis et al. |
| 2005/0265169 A1 | 12/2005 | Yoshimaru et al. |
| 2005/0278741 A1 | 12/2005 | Robarts et al. |
| 2006/0031883 A1 | 2/2006 | Ellis et al. |
| 2006/0085825 A1 | 4/2006 | Istvan et al. |
| 2006/0112410 A1 | 5/2006 | Poli et al. |
| 2006/0136966 A1 | 6/2006 | Folk |
| 2007/0157242 A1 | 7/2007 | Cordray et al. |
| 2007/0204308 A1 | 8/2007 | Nicholas et al. |
| 2008/0010655 A1 | 1/2008 | Ellis et al. |
| 2008/0013429 A1 | 1/2008 | Chen et al. |
| 2008/0134239 A1 | 6/2008 | Knowles et al. |
| 2008/0184304 A1 | 7/2008 | Ellis et al. |
| 2008/0184313 A1 | 7/2008 | Knudson et al. |
| 2008/0184322 A1 | 7/2008 | Blake |
| 2008/0189742 A1 | 8/2008 | Ellis et al. |
| 2008/0189743 A1 | 8/2008 | Ellis et al. |
| 2008/0263600 A1 | 10/2008 | Olague et al. |
| 2009/0044226 A1 | 2/2009 | Ellis et al. |
| 2009/0241144 A1 * | 9/2009 | LaJoie et al. .................... 725/40 |
| 2009/0297124 A1 | 12/2009 | Ng |
| 2011/0030027 A1 | 2/2011 | Nishioka et al. |

FOREIGN PATENT DOCUMENTS

| | | |
|---|---|---|
| DE | 44 31 438 | 3/1996 |
| DE | 4440174 | 5/1996 |
| DE | 195 02 922 | 8/1996 |
| DE | 19531121 | 2/1997 |
| DE | 19740079 | 3/1999 |
| EP | 0 439 281 | 7/1991 |
| EP | 0560593 | 9/1993 |
| EP | 0627857 | 12/1994 |
| EP | 0 682 452 | 11/1995 |
| EP | 0744853 | 11/1996 |
| EP | 0 753 964 | 1/1997 |
| EP | 0774853 | 5/1997 |
| EP | 0793225 | 9/1997 |
| EP | 0795994 | 9/1997 |
| EP | 0805594 | 11/1997 |
| EP | 0 836 320 | 4/1998 |
| EP | 0 836 321 | 4/1998 |
| EP | 0843468 | 5/1998 |
| EP | 0 854 645 | 7/1998 |
| EP | 0897242 | 2/1999 |

(56) References Cited

FOREIGN PATENT DOCUMENTS

| | | |
|---|---|---|
| EP | 0 940 983 | 9/1999 |
| EP | 1 099 339 | 5/2001 |
| EP | 1 099 341 | 5/2001 |
| EP | 1 271 952 | 1/2003 |
| EP | 1 515 549 | 3/2005 |
| EP | 1 538 838 | 6/2005 |
| FR | 2572235 | 4/1986 |
| FR | 2579397 | 9/1986 |
| GB | 2 227 622 | 8/1990 |
| GB | 2 229 595 | 9/1990 |
| GB | 2256115 | 11/1992 |
| GB | 2256546 | 12/1992 |
| GB | 2265792 | 10/1993 |
| GB | 2275800 | 9/1994 |
| GB | 2 286 754 | 8/1995 |
| GB | 2 300 551 | 11/1996 |
| GB | 2 346 251 | 8/2000 |
| JP | 02045495 | 2/1990 |
| JP | 03022770 | 1/1991 |
| JP | 3-35451 | 2/1991 |
| JP | 03059837 | 3/1991 |
| JP | 03215781 | 9/1991 |
| JP | 04250760 | 9/1992 |
| JP | 04-276342 | 10/1992 |
| JP | 05-260400 | 10/1993 |
| JP | 06014129 | 1/1994 |
| JP | 06046345 | 2/1994 |
| JP | 06-121262 | 4/1994 |
| JP | 06-124309 | 5/1994 |
| JP | 06-208500 | 7/1994 |
| JP | 06-261139 | 9/1994 |
| JP | 07-154349 | 6/1995 |
| JP | 07-184131 | 7/1995 |
| JP | 07-212328 | 8/1995 |
| JP | 07-212331 | 8/1995 |
| JP | 07-212732 | 8/1995 |
| JP | 07-298153 | 11/1995 |
| JP | 08-032528 | 2/1996 |
| JP | 08056352 | 2/1996 |
| JP | 08-180505 | 7/1996 |
| JP | 08-242313 | 9/1996 |
| JP | 08-242436 | 9/1996 |
| JP | 09-009245 | 1/1997 |
| JP | 09-065300 | 3/1997 |
| JP | 09-102827 | 4/1997 |
| JP | 09102827 | 4/1997 |
| JP | 09-120686 | 5/1997 |
| JP | 09-148994 | 6/1997 |
| JP | 09-162818 | 6/1997 |
| JP | 09-163287 | 6/1997 |
| JP | 09-270965 | 10/1997 |
| JP | 09-298677 | 11/1997 |
| JP | 09-322022 | 12/1997 |
| JP | 10-40057 | 2/1998 |
| JP | 10-108090 | 4/1998 |
| JP | 10-257448 | 9/1998 |
| JP | 10-512420 | 11/1998 |
| JP | 11-284929 | 10/1999 |
| JP | 11-317937 | 11/1999 |
| JP | 11-512903 | 11/1999 |
| KR | 1998/025758 | 7/1998 |
| WO | WO-87/03766 | 6/1987 |
| WO | WO-88/04507 | 6/1988 |
| WO | WO-89/03085 | 4/1989 |
| WO | WO-90/07844 | 7/1990 |
| WO | WO 90/13207 | 11/1990 |
| WO | WO-91/07050 | 5/1991 |
| WO | WO-91/08629 | 6/1991 |
| WO | WO-92/14284 | 8/1992 |
| WO | WO-92/17027 | 10/1992 |
| WO | WO 92/22983 | 12/1992 |
| WO | WO-94/14282 | 6/1994 |
| WO | WO-94/14284 | 6/1994 |
| WO | WO-94/15284 | 7/1994 |
| WO | WO-95/01056 | 1/1995 |
| WO | WO-95/01058 | 1/1995 |
| WO | WO-95/01059 | 1/1995 |
| WO | WO-95/10910 | 4/1995 |
| WO | WO 95/10916 | 4/1995 |
| WO | WO-95/28055 | 10/1995 |
| WO | WO 95/32583 | 11/1995 |
| WO | WO-95/32585 | 11/1995 |
| WO | WO-95/32587 | 11/1995 |
| WO | WO-96/07270 | 3/1996 |
| WO | WO 96/09721 | 3/1996 |
| WO | WO 96/13124 | 5/1996 |
| WO | WO-96/13932 | 5/1996 |
| WO | WO 96/17467 | 6/1996 |
| WO | WO-96/20555 | 7/1996 |
| WO | WO-96/26605 | 8/1996 |
| WO | WO 96/31980 | 10/1996 |
| WO | WO-96/34491 | 10/1996 |
| WO | WO-96/36172 | 11/1996 |
| WO | WO-96/37075 | 11/1996 |
| WO | WO-96/41478 | 12/1996 |
| WO | WO 97/12314 | 4/1997 |
| WO | WO-97/12486 | 4/1997 |
| WO | WO-97/13368 | 4/1997 |
| WO | WO 97/17774 | 5/1997 |
| WO | WO-97/19565 | 5/1997 |
| WO | WO-97/22207 | 6/1997 |
| WO | WO 97/23997 | 7/1997 |
| WO | WO-97/31480 | 8/1997 |
| WO | WO-97/33434 | 9/1997 |
| WO | WO-97/34413 | 9/1997 |
| WO | WO 97/35428 | 9/1997 |
| WO | WO-97/36422 | 10/1997 |
| WO | WO-97/46943 | 12/1997 |
| WO | WO-97/47106 | 12/1997 |
| WO | WO-97/47124 | 12/1997 |
| WO | WO-97/47143 | 12/1997 |
| WO | WO 97/48228 | 12/1997 |
| WO | WO-97/48230 | 12/1997 |
| WO | WO-97/49237 | 12/1997 |
| WO | WO-97/50251 | 12/1997 |
| WO | WO-98/06219 | 2/1998 |
| WO | WO-98/10589 | 3/1998 |
| WO | WO-98/10598 | 3/1998 |
| WO | WO 98/13932 | 4/1998 |
| WO | WO-98/16062 | 4/1998 |
| WO | WO 98/17063 | 4/1998 |
| WO | WO-98/17064 | 4/1998 |
| WO | WO-98/26584 | 6/1998 |
| WO | WO 98/26593 | 6/1998 |
| WO | WO 98/37694 | 8/1998 |
| WO | WO-98/43183 | 10/1998 |
| WO | WO 98/43416 | 10/1998 |
| WO | WO-98/56173 | 12/1998 |
| WO | WO-98/56176 | 12/1998 |
| WO | WO 98/59478 | 12/1998 |
| WO | WO-99/03267 | 1/1999 |
| WO | WO 99/04561 | 1/1999 |
| WO | WO-99/04570 | 1/1999 |
| WO | WO-99/14947 | 3/1999 |
| WO | WO-99/30491 | 6/1999 |
| WO | WO-99/45700 | 9/1999 |
| WO | WO-99/52279 | 10/1999 |
| WO | WO-99/57839 | 11/1999 |
| WO | WO-99/60783 | 11/1999 |
| WO | WO-99/66725 | 12/1999 |
| WO | WO-00/04706 | 1/2000 |
| WO | WO-00/04707 | 1/2000 |
| WO | WO 00/04709 | 1/2000 |
| WO | WO-00/07368 | 2/2000 |
| WO | WO-00/08850 | 2/2000 |
| WO | WO-00/08851 | 2/2000 |
| WO | WO-00/08852 | 2/2000 |
| WO | WO-00/16548 | 3/2000 |
| WO | WO-00/28739 | 5/2000 |
| WO | WO-00/58833 | 10/2000 |
| WO | WO-00/58967 | 10/2000 |
| WO | WO-00/59214 | 10/2000 |
| WO | WO-00/59233 | 10/2000 |
| WO | WO-00/62298 | 10/2000 |

(56) References Cited

FOREIGN PATENT DOCUMENTS

| | | |
|---|---|---|
| WO | WO-00/62299 | 10/2000 |
| WO | WO-00/62533 | 10/2000 |
| WO | WO-00/67475 | 11/2000 |
| WO | WO-01/22729 | 3/2001 |
| WO | WO-01/46843 | 6/2001 |
| WO | WO-01/47238 | 6/2001 |
| WO | WO-01/47249 | 6/2001 |
| WO | WO-01/47257 | 6/2001 |
| WO | WO-01/47273 | 6/2001 |
| WO | WO-01/47279 | 6/2001 |
| WO | WO-01/76239 | 10/2001 |
| WO | WO-01/76248 | 10/2001 |
| WO | WO-02/078317 | 10/2002 |
| WO | WO-03/098932 | 11/2003 |
| WO | WO-2004/054264 | 6/2004 |
| WO | WO-2005/091626 | 9/2005 |

OTHER PUBLICATIONS

U.S. Appl. No. 60/019,351, filed Jun. 6, 1996, Williams.
U.S. Appl. No. 60/020,580, filed Jun. 26, 1996, Goldschmidt.
U.S. Appl. No. 60/024,435, filed Aug. 22, 1996, Goldschmid.
U.S. Appl. No. 60/024,436, filed Aug. 22, 1996, Goldschmid.
U.S. Appl. No. 60/024,452, filed Aug. 27, 1996, Goldschmid.
"Advanced Analog Systems—Addressable Terminals" General Instrument Corp. of Horsham, Pennsylvania (URL:http//www.gi.com/BUSAREA/ANALOG/TERMINAL/WATCH/watch.html) Printed from the Internet on Mar. 4, 1999.
"DIRECTV Digital Satellite Receiver—Operating Instructions," Sony Electronics Inc. (2001).
"DIRECTV Receiver—Owner's Manual," DIRECTV, Inc. (2002).
"DIRECTV Receiver with TiVo Digital Satellite Receiver/Recorder SAT-T60—Installation Guide," Sony Corporation (2000).
"DIRECTV Receiver with TiVo Installation Guide," Philips (2000).
"DIRECTV Receiver with TiVo Viewer's Guide" (1999, 2000).
"DishPro Satellite System—User's Guide," Dish Network (undated).
"Electronic Programme Guide (EPG); Protocol for a TV Guide using electronic data transmission" by European Telecommunication Standards Institute, May 1997, Valbonne, France, publication No. ETS 300 707.
"Fall 2001 TiVo Service Update with Dual Tuner!," TiVo Inc. (2001).
"Honey, is there anything good on the remote tonight?", advertisement from Multichannel News, Broadband Week Section, p. 168, Nov. 30, 1998.
"How Evolve Works," from the Internet at http://www.evolveproducts.com/network.html, printed on Dec. 28, 1998.
"JiniTM Architecture Overview," by Jim Waldo, from the Internet at http://Java.sun.com/products/jini/whitepapers/architectureoverview.pdf/ printed on Jan. 25, 1999. The document bears a copyright date of 1998.
"PTV Recorder Setup Guide," Philips (2000).
"RCA Satellite Receiver Users Guide," Thomson Multimedia Inc. (2001).
"Reaching your subscribers is a complex and costly process—until now," from the Internet at http://www.evolveproducts.com/info.html, printed on Dec. 28, 1998.
"Start Here," Sony, TiVo and DIRECTV (undated).
"Sun's Next Steps in Digital Set-Tops," article in Cablevision, p. 56, Nov. 16, 1998.
"The Evolve EZ Guide. The Remote. Control," from the Internet at http://www.evolveproducts.com/display2.html, printed on Dec. 28, 1998.
"Using StarSight 2," published before Apr. 19, 1995.
"What is Jini?", from the Internet at http://java.sun.com/products/jini/whitepapers/whatsjini.pdf, printed on Jan. 25, 1999.
"Why Jini Now?", from the internet at http://java.sun.com/products/jini/whitepapers/whyjininow.pdf, printed on Jan. 25, 1999. The document bears a copyright date of 1998.
"Windows 98 Feature Combines TV, Terminal and the Internet," New York Times, Aug. 18, 1998.
Archived Intel Intercast's Website from Archieve. Org, "How Does It Work?", <http://web.archive.org/web/19990429214537/www.intercast.com/intercast/howitwks.htm>, Accessed on Jul. 8, 2008.
Archived Intel Intercast's Website from Archieve. Org, "What Is It?", <http://web.archive.org/web/19990422195517/www.intercast.com/intercast/whatisit.htm>, Accessed on Jul. 8, 2008.
Bach U et al, "Multimediales-TV-Gereat," Radio Fernsehen Electronik, De, Veb, Verlag, Technik, Berlin, vol. 45, No. 9, Aug. 1, 1996, pp. 28, 30-31, XP 000636538, ISSN: 1436-1574 (Translation, pp. 1-5).
Bach U et alk "Multimedia-Terminal ALS Endgeraet," Funkschau, De, Franzis-Verlag K.G. Munchen, vol. 68, No. 6, Mar. 1, 1996, pp. 70-75, XP 000556486, ISSN: 0016-2841 (Translation, pp. 1-7).
Brad Schepp et al., "The Complete Guide to CompuServe," Chapter 7, "IQuest and General Information Gathering," pp. 211-258, (McGraw-Hill Osborne Media, Har/Dis edition 1990).
Claims filed in U.S. Appl. No. 12/759,303 in Preliminary Amendment dated Apr. 13, 2010.
Office Actions and Corresponding Replies in relation to U.S. Appl. No. 10/251,670.
Office Actions and Corresponding Replies in relation to U.S. Appl. No. 10/718,187.
Office Actions and Corresponding Replies in relation to U.S. Appl. No. 11/600,944.
Curt Rogers, "Telcos vs. Cable TV: The Global View," Data Communications, No. 13, New York, pp. 75, 76, 78 and 80, Sep. 1995.
Digital Video Broadcasting (DVB); DVB specification for data broadcasting, European Telecommunications Standards Institute, Draft EN 301 192 V1.2.1 (Jan. 1999).
DiRosa, S. "Pinochle's BIGSURF Netguide", Jul. 1995, Volute 3.1, pp. 260-270.
Examiner Interview Summary in U.S. Appl. No. 09/356,161 dated Aug. 10, 2005.
Final Office Action in U.S. Appl. No. 09/356,161 dated Jun. 17, 2005.
Final Office Action in U.S. Appl. No. 11/179,410 dated Apr. 27, 2009.
Final Office Action in U.S. Appl. No. 11/894,618 dated Aug. 3, 2009.
Hirtz Gentlemen: Et al:, "Open TV: Betriebssystem Fuer Interaktives Fernsehen," Fernseh Und Kinotechnik, de vde Verlag GMBH, Berlin, vol. 50, No. 3, Mar. 1, 1996, pp. 84-89, XP 000581417, ISSN: 0015-0142 (Translation, pp. 1-9).
Hofmann, Neumann, Oberlies, and Schadwinkel, "Videotext Programmiert Videorecorder," Rundfunktechnische Mitteilungen, Nov.-Dec. 1982, pp. 254-257.
International Preliminary Examination Report, International Application No. PCT/US97/18664, Dec. 7, 1998, 10 pages.
Motorola, Inc.; Integrated Datacasting Solutions for Digital Television XP-002204351; Jun. 1999.
Non-Final Office Action filed in U.S. Appl. No. 11/894,724 dated Jun. 9, 2009.
Non-Final Office Action filed in U.S. Appl. No. 11/894,724 dated Sep. 19, 2008.
Non-Final Office Action in U.S. Appl. No. 09/356,161 dated Oct. 7, 2004.
Non-Final Office Action in U.S. Appl. No. 11/179,410 dated Jul. 23, 2008.
Non-Final Office Action in U.S. Appl. No. 11/894,618 dated Oct. 1, 2008.
PCT Notification of Transmittal of International Search Report, International Application No. PCT/US00/05887, Aug. 2000, 2 pages.
Reply to Non-Final Office Action filed in U.S. Appl. No. 11/894,724 dated Mar. 19, 2009.
Reply to Non-Final Office Action in U.S. Appl. No. 09/356,161 dated Mar. 7, 2005.
Reply to Non-Final Office Action in U.S. Appl. No. 11/179,410 dated Jan. 23, 2009.
Reply to Non-Final Office Action in U.S. Appl. No. 11/894,618 dated Apr. 6, 2009.
Request for Continued Examination and Reply to Final Office Action in U.S. Appl. No. 11/894,618 dated Feb. 3, 2010.
Research Disclosure, No. 329, Sep. 1991, Havant GB, p. 657, XP226205, "Installation of consumer apparatus".

(56) References Cited

OTHER PUBLICATIONS

Rewind, replay and unwind with new high-tech TV devices, by Lawrence J. Magid, LA Times. This document was printed from the Internet on Jun. 6, 1999 and bears a date of May 19, 1999.
Saito, Takeshi, et al., "Homenetwork Architecture Considering Digital Home Appliance," Technical Committee meeting of the Institute of Electronics, Information and Communication Engineers (IEICE), Japan, Nov. 6, 1997, vol. 97, No. 368, p. 57-64.
Supplementary European Search Report, Feb. 25, 2000, Application No. EP 97 91 0985.
U.S. Appl. No. 10/927,814, various Office Actions issued by the United States Patent Office and applicants' responses; as well as Request for Interference, Examiner Interview Summary and Applicant Summary of Interview with Examiner.
U.S. Appl. No. 11/179,410, Office Action issued by the United States Patent Office and applicants' response.
U.S. Appl. No. 11/894,741, Office Action dated Jun. 23, 2009 and Examiner Interview Summary dated Jun. 24, 2009.
U.S. Appl. No. 08/922,212, various Office Actions issued by the United States Patent Office and applicants' responses along with a Notice of Abandonment.
U.S. Appl. No. 10/241,112, various Office Actions issued by the United States Patent Office and applicants' responses along with Notice of Appeal.
U.S. Appl. No. 10/927,582, various Office Actions issued by the United States Patent Office and applicants' responses; as well as Request for Interference.
U.S. Appl. No. 11/246,392, various Office Actions issued by the United States Patent Office and applicants' response.
U.S. Appl. No. 11/894,741, various Office Actions issued by the United States Patent Office and applicants' response.
User's Guide RCA Color TV with TV Plus + Guide, 1997.
Venditto, G., Prodigy for Dummies, IDG Books, pp. 57-63, 213 (1995).
Verknuepfung von TV mit INternet, Funkschau, De, Franzis—Verlag K.G. Munchen, vol. 68, No. 18 Aug. 16, 1996, pp. 70-71, XP 000631189, ISSN: 0016-2841 (Translation, pp. 1-3).
Von Andreas Neumann, "WDR Online Aufbau Und Perspektiven Automatisierter Online-Dienste Im WDR," Rundfunktechnische Mitteilungen, vol. 41, pp. 56-66, Jun. 1997.
Von Gerhard Eitz, "Zukünftige Informations- Und Datenangebote Beim Digitalen Fernsehen—EPG Und "Lesezeichen"," Rundfunktechnische Mitteilungen, vol. 41, pp. 67-72, Jun. 1997.
U.S. Appl. No. 08/900,417, filed Jul. 25, 1997, Daniels.
Counterstatement of the Patentee for European Patent EP-B-1099341 (Feb. 23, 2006).
EPO Opposition Submission for European Patent EP-B-1099341 dated Mar. 19, 2010.
Ochiai et al., "@randomTV: A New TV System," NEC C&C Media Research Laboratories, Mar. 17, 1998, pp. 3-302-3-303.
Opposition against EP99935637 by Fast TV Server AG (Aug. 3, 2005).
Opposition against EP99935637 by Velocity 303 Limited (Aug. 3, 2005).
Submission by Velocity in European Patent No. 1099341 (Mar. 19, 2010).
Office Actions and/or Replies from U.S. Appl. No. 10/877,950, filed Jun. 25, 2004.
Office Actions and/or Replies from U.S. Appl. No. 12/759,303, filed Apr. 13, 2010.
Office Actions and/or Replies from U.S. Appl. No. 12/773,423, filed May 4, 2010.
Office Actions and Replies from U.S. Appl. No. 10/877,950, filed Jun. 25, 2004.
Teletext System, National Technical Report, vol. 27, No. 4, Aug. 1981 (full English language translation previously submitted).
EPO Opposition Against EP1213919 by Virgin Media Limited (Dec. 16, 2010).
EPO Opposition Statement of Grounds of Appeal for EP1099341 dated Feb. 28, 2011.
U.S. Appl. No. 60/093,292, filed Jul. 17, 1998, Ellis.
U.S. Appl. No. 60/097,527, filed Aug. 21, 1998, Ellis.
"Description of Digital Audio-Visual Functionalities," Digital Audio-Visual Council, DAVIC 1.3.1 Specification Part 1, Technical Report, 86 pages, 1998.
Digital Video Broadcasting (DVB); Digital Recording Extension to Globally Executable Multimedia Home Platform (GEM), European Telecommunications Standards Institute, ETSI TS 102 817 V1.1.1 (Sep. 2007).
EBU Technical Review, published by European Broadcasting Union, Geneva, Switzerland, No. 275, Spring 1998, pp. 1-54.
Piesing, J., "Introduction to the MHP PVR/PDR/DVR Specification," Chair "Technical Aspects of the MHP" Philips Applied Technologies, Redhill, UK, Copyright Digital Video Broadcasting Project DVB, undated.
"Set-Top Box for Interactive Services," by R.A. Bissell and A. Eales, Multimedia Telecommunications, Chapman & Hall, London, England, Edited by Bill Whyte, published 1997, Chapter 6, pp. 116-138.
Office Action and Replies from U.S. Appl. No. 10/877,950, filed Jun. 25, 2004.
Office Action and Replies from U.S. Appl. No. 10/927,582, filed Aug. 26, 2004.
Office Action and Replies from U.S. Appl. No. 11/894,741, filed Aug. 20, 2007.
Office Action and Replies from U.S. Appl. No. 11/246,392, filed Oct. 7, 2005.
Office Action and Replies from U.S. Appl. No. 10/927,814, filed Aug. 26, 2004.
Counterstatement of the Patentee for European Patent EP 1 213 919B dated Sep. 20, 2011.
"Student.Net TV Search & Remind," from the internet at http://web.archive.org/web/19970124213237/http://www.student.net/tv/ and http://web.archive.org/web/19970124214926/www.student.net/tv/search.cgi?searchTerm=Fri . . . , printed on May 12, 2005.
"The History Behind Broadcatch—SmarTV (1989)," Broadcatch Technologies, from the internet at http://www.broadcatch.com/smartv.html, Jul. 1989, pp. 1-6, printed from the internet on Aug. 31, 2005.
Derwent Abstracts, RD 385002 A, "Electronic Program Guide System via Internet Uses Television Programs Displayed on Internet Pages and Associates it With Program Label and On-Screen Icons to Remotely Program and Control TV Receiver w.r.t. Selected Program," published May 10, 1996.
Tedesco, R., "WebTV Clicks on 'TV Guide'," Broadcasting & Cable, vol. 127, No. 3, Jan. 20, 1997, p. 56.
Office Actions and/or Replies from U.S. Appl. No. 10/927,582, filed Aug. 26, 2004.
Office Actions and/or Replies from U.S. Appl. No. 11/894,741, filed Aug. 20, 2007.
Office Actions and Replies from U.S. Appl. No. 10/927,582, filed Aug. 26, 2004.
Office Actions and Replies from U.S. Appl. No. 11/894,741, filed Aug. 20, 2007.
Bestler, "Flexible Data Structures and Interface Rituals for Rapid Development of OSD Applications," 42nd Annual Convention and Exposition of the National Cable Television Association (NCTA), Technical Papers, Jun. 6-9, 1993, pp. 223-236.
DAVIC 1.0 Specifications, Revision 3.2, Part 1, "Description fo DAVIC Functionalities," Digital Audio-Visual Council, Jul. 10, 1995, 61 pages.
English High Court Judgment, Neutral Citation No. [2014] EWHC 828 (Pat), Case No. HC11C04556, *Starsight Telecast, Inc. and United Video Properties, Inc.* v. *Virgin Media Limited, Virgin Media Payments Limtied, and TiVo, Inc.*, Mar. 26, 2014.
Uniden®, UST-4800 Super, Integrated Receiver/Descrambler, Preliminary Reference Manual, Nov. 12, 1991, 80 pages.

* cited by examiner

INTERACTIVE TELEVISION PROGRAM GUIDE SYSTEM HAVING MULTIPLE DEVICES WITHIN A HOUSEHOLD

This application is a continuation of U.S. patent application Ser. No. 11/894,618, filed Aug. 20, 2007, which is a continuation of U.S. patent application Ser. No. 11/179,410, filed Jul. 11, 2005 (now abandoned), which is a continuation of U.S. patent application Ser. No. 09/356,161, filed Jul. 16, 1999 (now abandoned), which claims the benefit of U.S. provisional patent application No. 60/093,292, filed Jul. 17, 1998, each of which is hereby incorporated by reference herein in its entirety.

BACKGROUND OF THE INVENTION

This invention relates to interactive television program guides, and more particularly, to techniques for providing interactive television program guide functionality on multiple devices within a household.

Cable, satellite, and broadcast television systems provide viewers with a large number of television channels. Viewers have traditionally consulted printed television program schedules to determine the programs being broadcast at a particular time. More recently, interactive electronic television program guides have been developed that allow television program information to be displayed on a viewer's television.

Interactive television program guides are typically implemented on set-top boxes. Such programs guides allow users to view television program listings in different display formats. For example, a user may instruct the program guide to display a grid of program listings organized in a channel-ordered or a time-ordered list. Users may also search or sort program listings by theme (e.g., movies, sports, etc.) or by title (i.e., alphabetically). A user may obtain additional information for a program by placing a highlight region on a desired program listing and pressing an "info" button.

Households with children are concerned with protecting children from the potentially objectionable adult content contained in the broad range of programs that are currently available. Some program guides allow users to block channels or programs using a parental control function. For example, a user may instruct the program guide to block access to channels that provide adult programs. A user must enter a password to regain access to such adult channels.

Another feature available on some program guides is the ability for the cable operator to send messages such as billing information to the user. A user may also have the ability to set reminders that will alert the user when a preselected program is about to begin or that will automatically tune the user's set-top box to the channel of the preselected program when the program is about to begin. A user may have the ability to establish a list of favorite channels. All of these program guide settings and features are specific to the user's set-top box.

Families often have multiple televisions and set-top boxes placed throughout the household. A family's household even may include multiple homes. Because there is no coordination between the program guides running on each of the various set-top boxes in the household, if a user adjusts the settings for a program guide on one set-top box, these settings are not communicated to the program guides on any of the other set-top boxes in the household. If a parent wants to restrict access to certain channels on all the televisions in the household, the parent must adjust the parental control settings on each set-top box individually. Reminders and favorite channel settings must similarly be set for each program guide separately if a user desires to have such settings be in effect throughout the household. Messages sent from the cable operator can only be sent to a particular set-top box. Some cable system subscriber management systems can allow a cable operator to manage all cable boxes within a home (i.e. manage billing for individual locations within a home). However, such systems do not allow user interaction with the cable operator.

It is therefore an object of the present invention to provide a program guide system that allows a user to adjust to the user settings of a plurality of program guides at different locations within a household from a single location.

SUMMARY OF THE INVENTION

These and other objects of the present invention are accomplished in accordance with the principles of the present invention by providing an interactive television program guide system for a household in which multiple interactive television program guides within the household are coordinated. In a typical system, various users in the household use various pieces of user television equipment (also called user television equipment devices). An interactive television program guide is implemented on each piece of user television equipment. Typical user television equipment may be a set-top box on which a program guide application and non-program-guide applications run, a videocassette recorder connected to the set-top box for recording television programs, and a television on which the program guide application may display various program guide display screens and the non-program-guide applications may display various non-program-guide display screens. Other suitable types of user television equipment may be based on personal computer televisions (PC/TVs) or advanced television receivers such as high-definition television (HDTV) receivers.

Each piece of user television equipment may be located in a different part of the home. For example, one piece of equipment may be located in the parents' bedroom. Another piece of equipment may be located in a child's bedroom. Additional pieces of equipment may be located in a family room, kitchen, living room, etc.

Typical program guide features that may be provided by the program guides of this invention implemented on the user television equipment include features related to setting program reminders, profiles, program recording features, messaging features, favorites features, parental control features, program guide set up features (e.g., video display settings, language settings, etc.), and other suitable program guide features. The system coordinates operation of the program guides so that, for example, a user may adjust his favorite channel settings on a program guide operating in the living room and those settings will be effective on the program guide operating in the master bedroom and may therefore be used by that program guide.

A parent may adjust parental control settings using the program guide in the parents' room and the system may apply those settings to all program guides in the household. Parents may use the parental control feature to control the viewing of their children even though the children may be viewing television using multiple user television equipment devices. For example, parents may establish parental controls to lock various programs and services from a master location and the system will apply these parental controls to the various pieces of user television equipment throughout the household. The ability to establish favorite channels, to set reminders, and to control other program guide settings at one location and to have those settings applied to multiple locations throughout the household may be used by both the parents and their children.

A user may adjust his favorite settings on a program guide in the family room and may direct the system to apply those settings to the program guides in the family room and the living room. A child may set reminders for certain programs using the program guide in the family room and may direct the system to apply those settings only to the program guide running in that child's bedroom. A user may select a program for recording using a program guide in the living room and may request that the videocassette recorder in the family room be used to record the selected program. A user may receive messages from a cable system operator and may direct the system to make certain types of those messages available to the program guide located in all rooms but the children's room. A user may adjust language or audio settings using one program guide and have those settings apply globally.

As these examples serve to illustrate, the settings for any suitable program guide features may be adjusted using the program guide at one location in a household and applied by the system to selected other program guides in the household.

The program guides may be linked using any suitable topologies and communication protocols. For example, the various pieces of user television equipment may be interconnected using a tree, bus or ring topology. One piece of user television equipment may be designated as a primary device and other pieces of user television equipment may be designated as secondary devices. The primary and secondary devices may be connected in a star arrangement. A remote server may be used to implement certain program guide features and the pieces of user television equipment in the home may act as clients.

If desired, non-program-guide applications may be implemented on the user television equipment. Such non-program-guide applications may include, for example, a web browser application, a home shopping application, a game application, an e-mail application, a chat application, a banking application, etc. These applications may be implemented on a set-top box within the user television equipment. The user may adjust the settings of such a non-program-guide application at one set-top box. The system coordinates the operation of the various set-top boxes so that the adjusted settings may be used by similar applications running on other set-top boxes in the household.

DETAILED DESCRIPTION OF THE PREFERRED EMBODIMENTS

Figure 1:
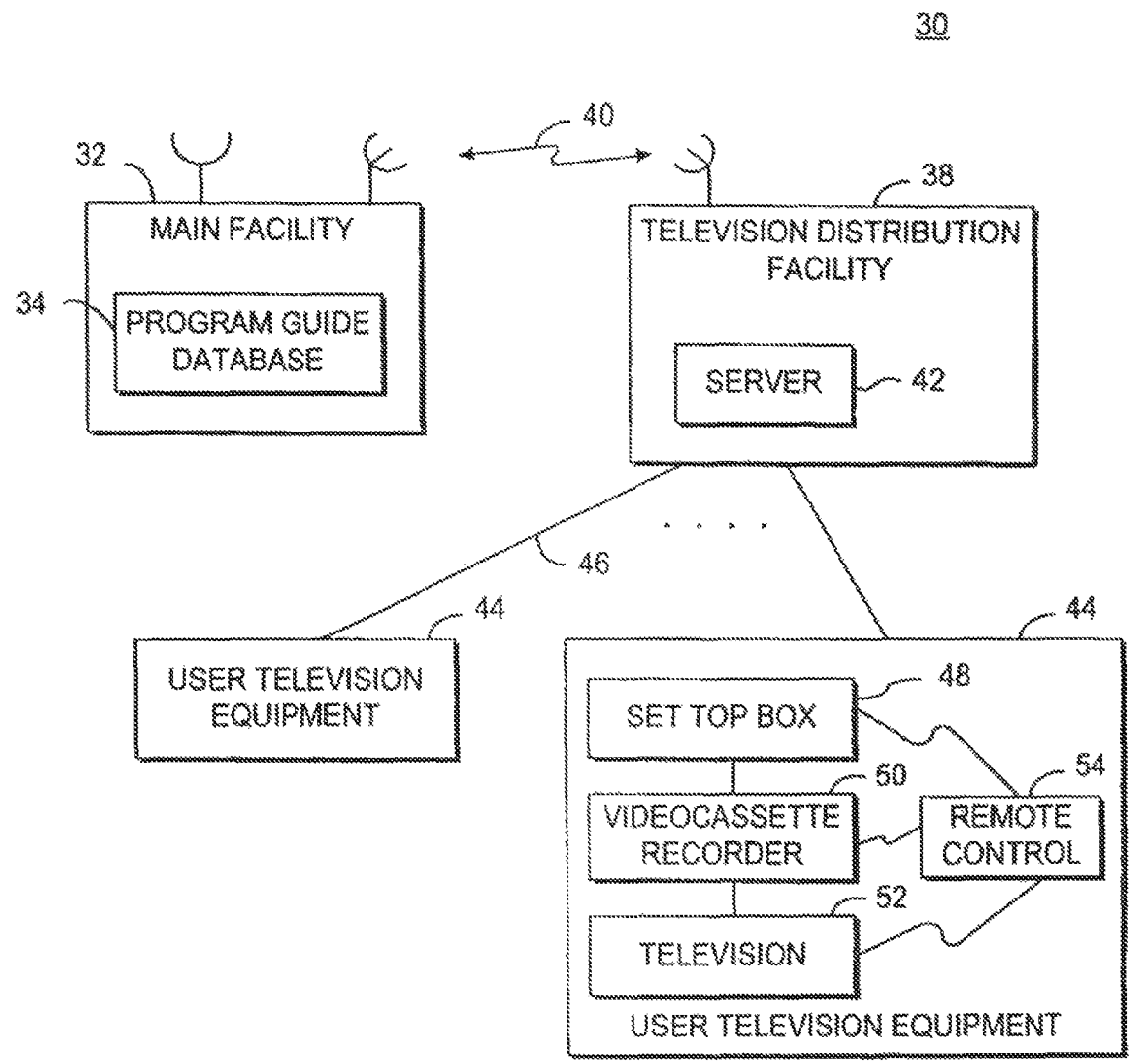
FIG. 1 is a diagram of an interactive television program guide system in accordance with the present invention.

An illustrative program guide system 30 in accordance with the present invention is shown in FIG. 1. Main facility 32 contains a program guide database 34 for storing program guide information such as television program guide program listings data, pay-per-view ordering information, television program promotional information, etc. Information from database 34 may be transmitted to multiple television distribution facilities such as television distribution facility 38 via communications links such as communications link 40. Only one such television distribution facility 38 and one communications link 40 are shown in FIG. 1 to avoid over-complicating the drawings. Link 40 may be a satellite link, a telephone network link, a cable or fiber optic link, a microwave link, a combination of such links, or any other suitable communications path. If it is desired to transmit video signals (e.g., for advertising and promotional videos) over link 40 in addition to data signals, a relatively high bandwidth link such as a satellite link is generally preferable to a relatively low bandwidth link such as a telephone line.

Television distribution facility 38 is a facility for distributing television signals to users, such as a cable system headend, a broadcast distribution facility, or a satellite television distribution facility or the like.

The program guide information transmitted by main facility 32 to television distribution facility 38 includes television program listings data such as program times, channels, titles, descriptions, etc. Transmitted program guide information may also include pay program data such as pricing information for individual programs and subscription channels, time windows for ordering programs and channels, telephone numbers for placing orders that cannot be impulse ordered, etc. If desired, some of the program guide and advertising information may be provided using data sources at facilities other than main facility 32. For example, data related to pay program order processing (e.g., billing data and the like) may be generated by an order processing and billing system that is separate from main facility 32 and separate from television distribution facility 38. Similarly, advertising information may be generated by an advertising facility that is separate from main facility 32 and television distribution facility 38.

A server 42 may be provided in television distribution facility 38 for handling data distribution tasks and for storing local information. If desired, server 42 may be used to implement a client-server based interactive television program guide system. In such a system, client functions may be performed at user television equipment 44. Server 42 may be capable of handling text, graphics, and video.

Television distribution facility 38 distributes program guide and advertising information to the user television equipment 44 of multiple users via communications paths 46. Program guide data and other information may be distributed over an out-of-band channel on paths 46 or using any other suitable distribution technique.

Each user has a receiver, which is typically a set-top box such as set-top box 48, but which may be other suitable television equipment into which circuitry similar to set-top-box circuitry has been integrated. If desired, user television equipment 44 may be an advanced television receiver or a personal computer television (PC/TV). For purposes of illustration, the present invention will generally be described in connection with user television equipment based on a set-top box arrangement. Program guide data may be distributed to set-top boxes 48 periodically and stored or may be distributed continuously and handled "on the fly.", or by request. Television distribution facility 38 may poll set-top boxes 48 periodically for certain information (e.g., pay program account information or information regarding programs that have been purchased and viewed using locally-generated authorization techniques). Main facility 32 preferably contains a processor to handle information distribution tasks. Each set-top box 48 preferably contains a processor to handle tasks associated with implementing a program guide application on the set-top box 48. Television distribution facility 38 may contain a processor for tasks associated with implementing server 42 and for handling tasks associated with the distribution of program guide and other information.

Each set-top box 48 is may be connected to an optional videocassette recorder 50 or other suitable recording device (e.g., digital storage device) so that selected television programs may be recorded. Each videocassette recorder 50 may be connected to a television 52. To record a program, set-top box 48 tunes to a particular channel and sends control signals to videocassette recorder 50 (e.g., using an infrared transmitter) that direct videocassette recorder 50 to start and stop recording at the appropriate times.

During use of the interactive television program guide implemented on set-top box 48, television program listings may be displayed on television 52. Each set-top box 48, videocassette recorder 50, and television 52 may be controlled by one or more remote controls 54 or any other suitable user input interface such as a wireless keyboard, mouse, trackball, dedicated set of buttons, etc.

Communications paths 46 preferably have sufficient bandwidth to allow television distribution facility 38 to distribute scheduled television programming, pay programming, advertising and other promotional videos, and other video information to set-top boxes 44 in addition to non-video program guide data. Multiple television and audio channels (analog, digital, or both analog and digital) may be provided to set-top boxes 48 via communications paths 46. If desired, program listings and other information may be distributed by one or more distribution facilities that are similar to but separate from television distribution facility 38 using communications paths that are separate from communications paths 46.

Certain functions such as pay program purchasing may require set-top boxes 48 to transmit data to television distribution facility 38 over communications paths 46. If desired, such data may be transmitted over telephone lines or other separate communications paths. If functions such as these are provided using facilities separate from television distribution facility 38, some of the communications involving set-top boxes 48 may be made directly with the separate facilities.

Figure 2:
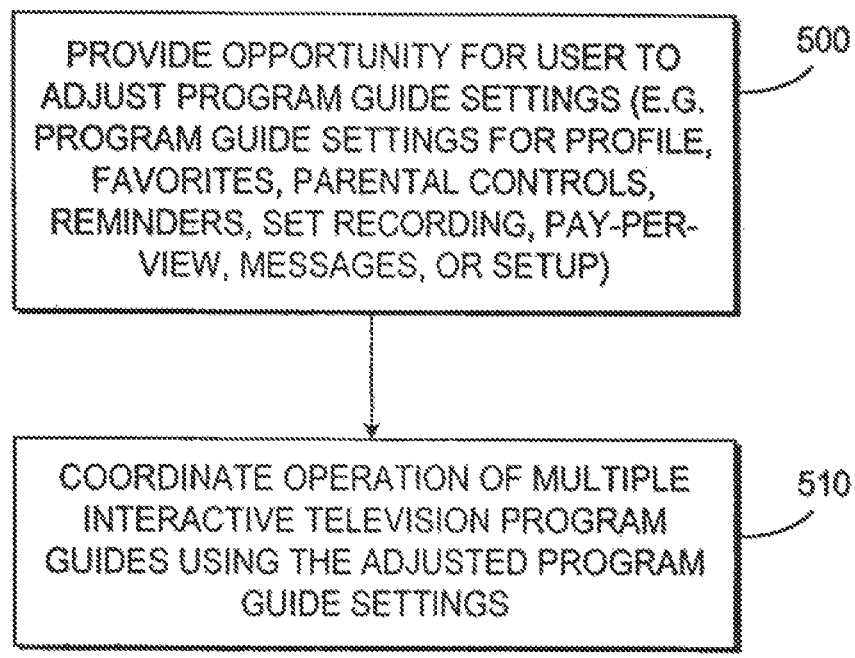
FIG. 2 is a flow chart of steps involved in adjusting user settings and applying those adjustments to desired locations in accordance with the present invention.

The present invention involves the distribution of user program guide settings to multiple program guide locations within a household. Such a household may contain multiple pieces of user television equipment. A program guide may be implemented on each piece of user television equipment. An illustrative process for distributing such settings is shown in FIG. 2. At step 500, a first program guide provides the user with an opportunity to adjust program guide settings (e.g., program guide settings for user profiles, favorites, parental controls, reminders, recording options, pay-per-view options, message options, or other setup functions). At step 510, the system coordinates the operation of the multiple interactive television program guides so that the program guide settings that were adjusted with the first interactive television program guide are effective on a second interactive television program guide and may be used by that second interactive television program guide.

The steps of FIG. 2 are preferably performed using program guides as the program guides implemented on set-top boxes 48 of FIG. 1. Certain program guide functions (particularly the display of graphics or videos) may involve the use of resources located at main facility 32 and television distribution facility 38 and other such facilities. If desired, some of the steps of FIG. 2 may be performed using an application running on set-top boxes 48 other than the interactive program guide. For clarity, the principles of the invention are described in the context of an arrangement in which the set-top-based steps of FIG. 2 are performed primarily using an interactive television program guide.

FIGS. 3, 4a, 4b, 4c, 5, and 6 show various illustrative topologies for configuring multiple program guides within a household.

Figure 3:
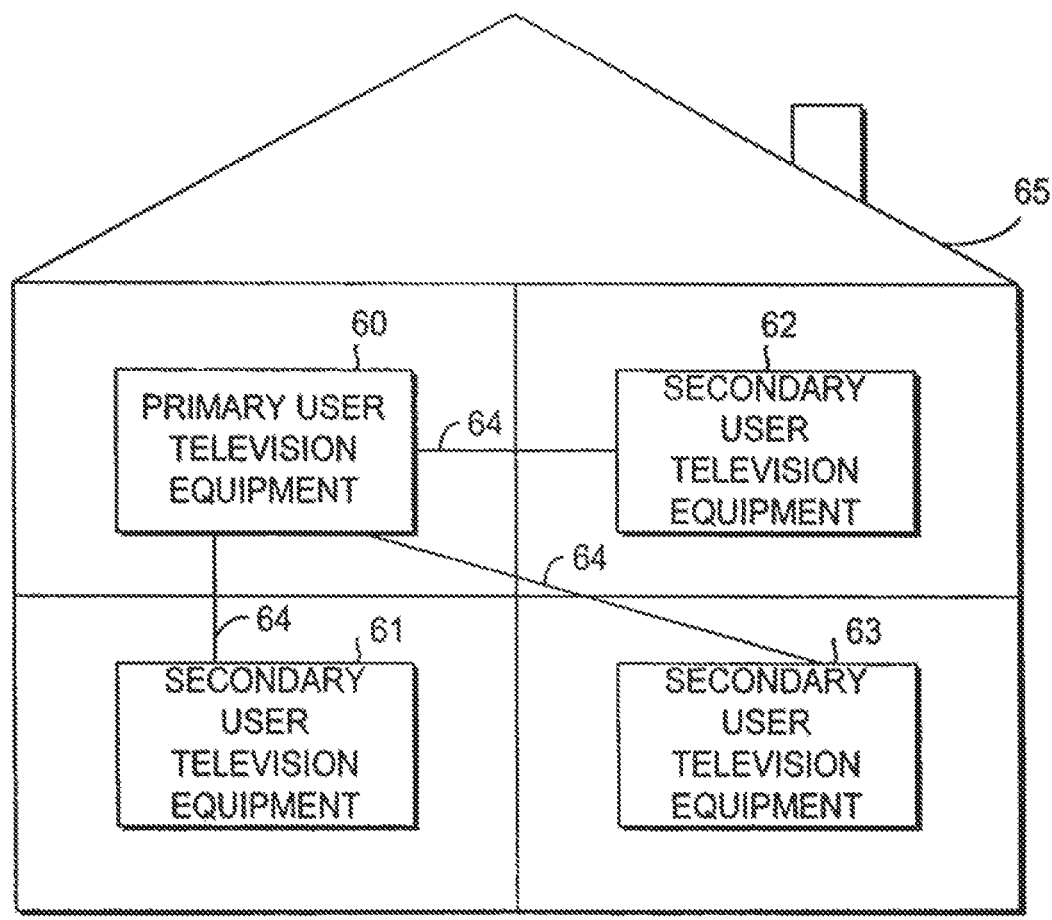
FIG. 3 is a diagram of a system in which multiple interactive television program guides are implemented in a star configuration accordance with the present invention.

FIG. 3 shows an illustrative arrangement for interconnecting various user television equipment devices in accordance with the present invention. Primary user television equipment 60 may be connected to secondary user television equipment 61, secondary user television equipment 62, and secondary user television equipment 63 via communication paths 64. Communications paths 64 may be any suitable communications path for in-home network, such as twisted pair lines, Ethernet links, fiber optics, power lines, radio-frequency (RF) links, infrared (IR) and links other wireless links, firewire (IEEE 1394) paths, dedicated cables, etc. As shown, one or more pieces of secondary user television equipment may be connected to primary user television equipment 60 in a star configuration if desired. User television equipment devices are typically located in different rooms within home 65. For example, primary user television equipment 60 may be placed in the parents' bedroom, secondary user television equipment 61 may be placed in the children's room, secondary user television equipment 62 may be placed in a living room, and secondary user television equipment 63 may be placed in a guest room. With such an arrangement, the parents' bedroom may be used as a master location to adjust user settings for the program guides on the user television equipment in the children's room and the other rooms.

Figure 4A:
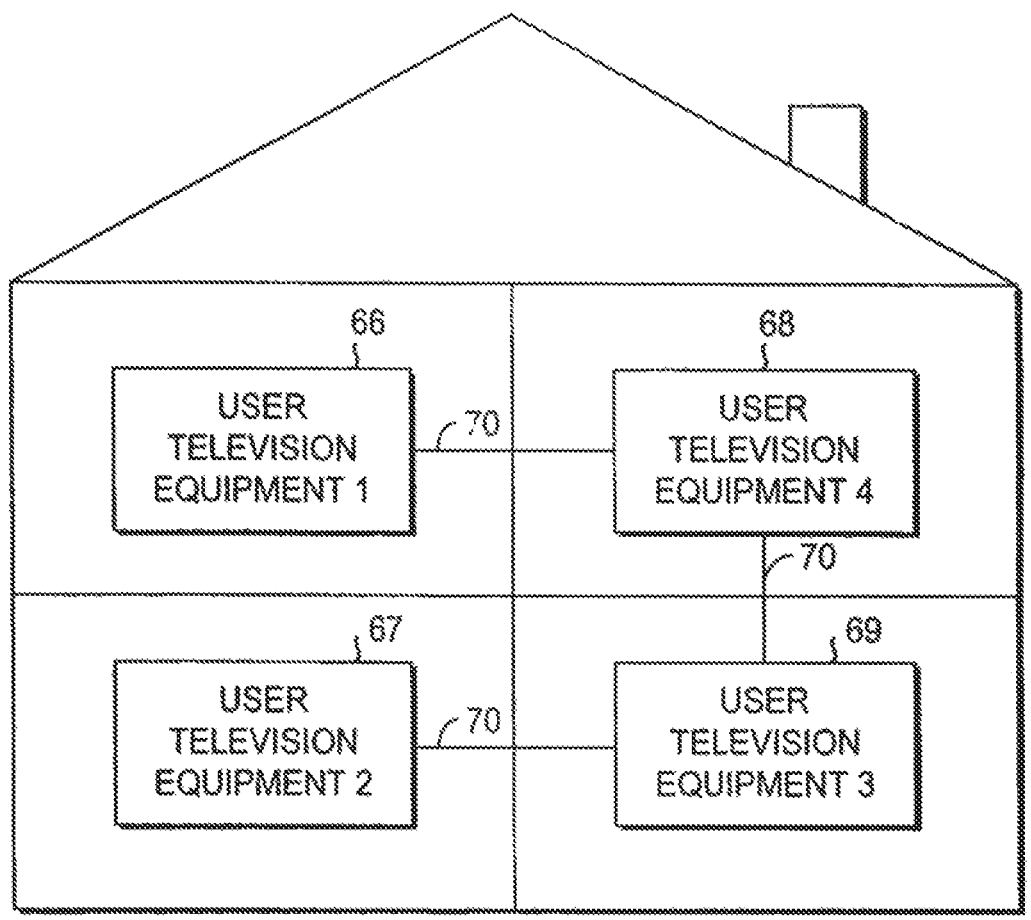
FIG. 4a is a diagram of a system in which multiple interactive television program guides are implemented in a tree configuration in accordance with the present invention.
Figure 4B:
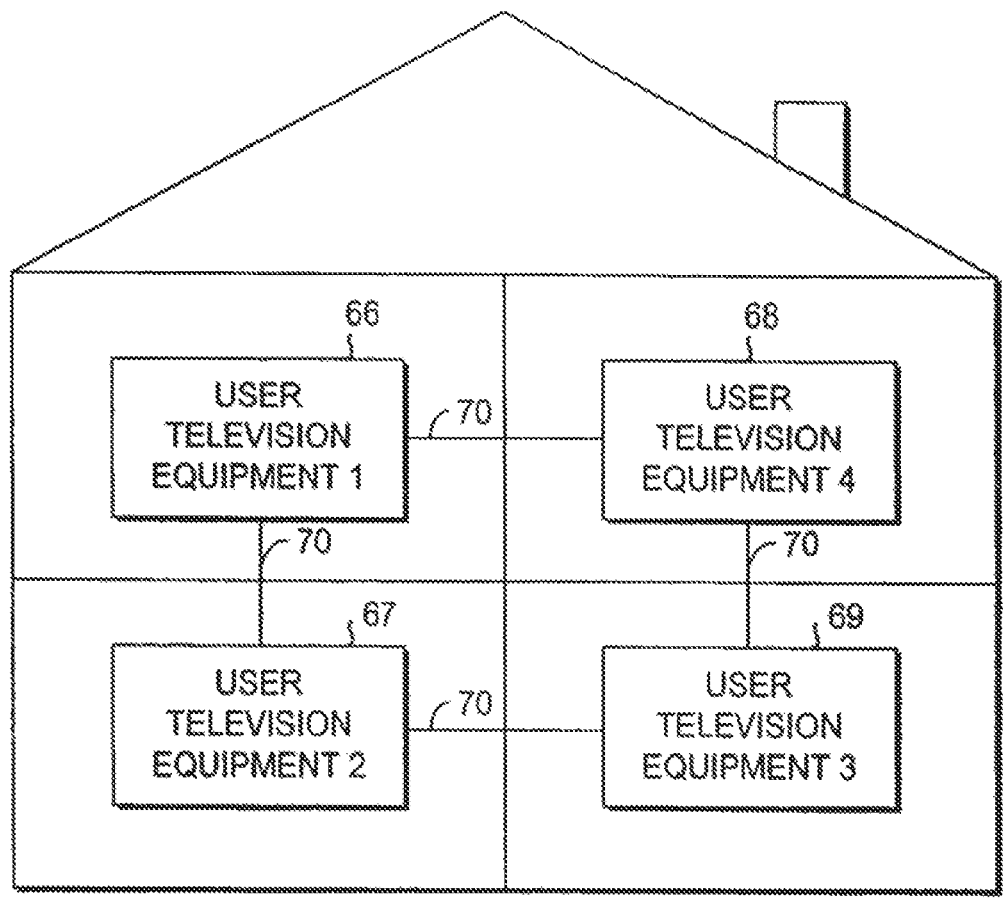
FIG. 4b is a diagram of a system in which multiple interactive television program guides are implemented in a ring configuration in accordance with the present invention.
Figure 4C:
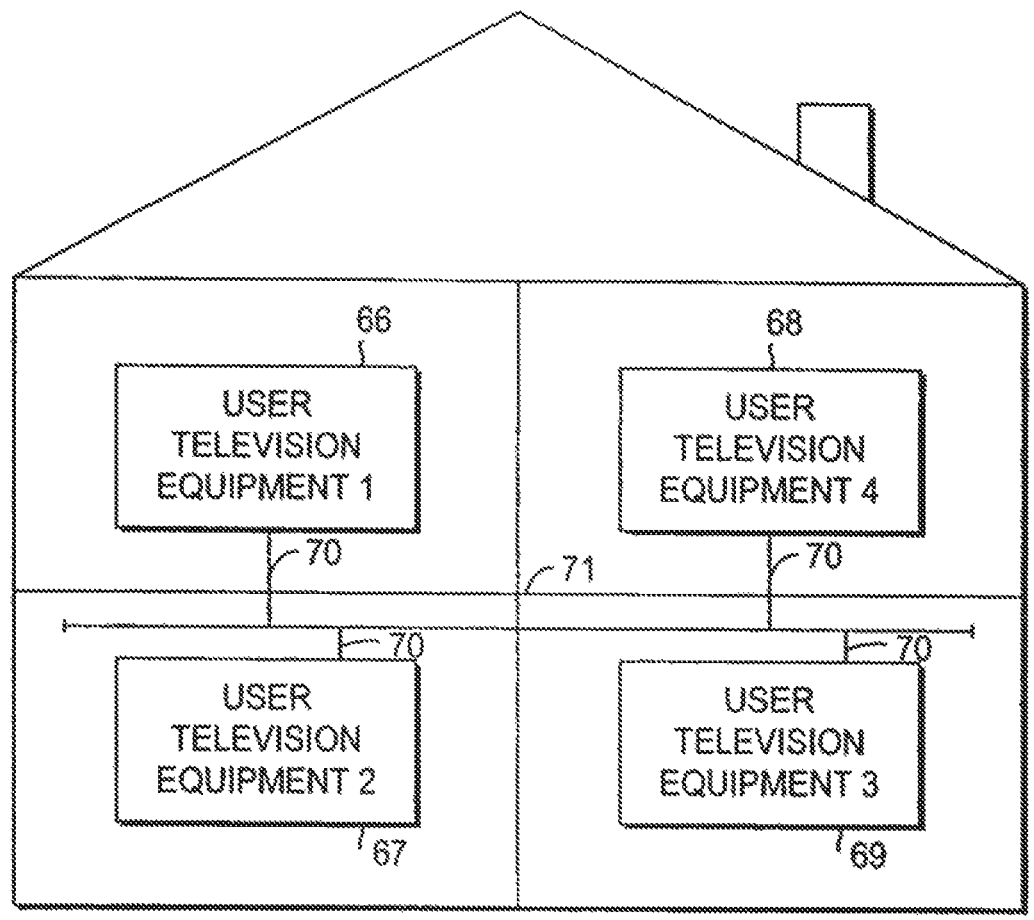
FIG. 4c is a diagram of a system in which multiple interactive television program guides are implemented in a bus configuration in accordance with the present invention.

FIG. 4a shows an illustrative tree configuration in which each piece of user television equipment is interconnected with another along a single path. User television equipment 66, 67, 68, and 69 of FIG. 4 are connected to each of the others via communications paths 70. Communications paths 70 may be any suitable communications path for in-home network, such as twisted pair lines, Ethernet links, fiber optics, power lines, radio-frequency (RF) links, infrared (IR) and links other wireless links, firewire (IEEE 1394) paths, dedicated cables, etc. Two or more pieces of user television equipment may be connected in this way. The equipment mentioned above may be placed in various rooms within home 65. For example, user television equipment 66 may be placed in a parents' bedroom, user television equipment 67 may be placed in a children's room, user television equipment 68 may be placed in a living room, user television equipment 69 may be placed in a guest room. With the arrangement of FIG. 4a, each piece of user television equipment in home 65 may communicate with each other piece of user television equipment in home 65 over communications paths 70. FIG. 4a shows the system connected in a tree topology. If desired, this level of interconnectivity may be achieved using communications paths that are arranged in a ring configuration (FIG. 4b), bus configuration (FIG. 4c) or other suitable topology. Any of these topologies may use the types of communications paths described in connection with the arrangement of FIG. 4a.

Figure 5:
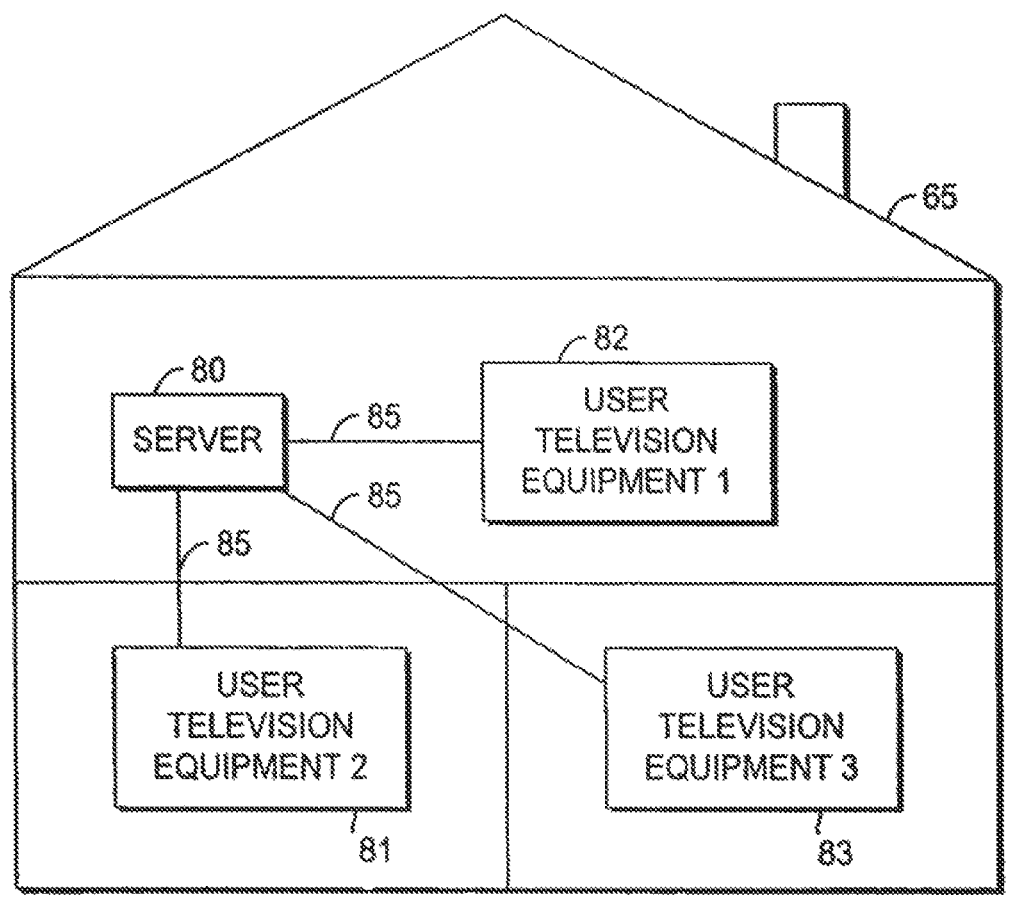
FIG. 5 is a diagram of another system in which multiple interactive television program guides are implemented in a client-server configuration in accordance with the present invention.

FIG. 5 shows an illustrative configuration based on a client-server architecture. Server 80 may be connected to user television equipment 81, 82, and 83 via communication paths 85. Equipment 81, 82, and 83 and server 80 may be placed in various rooms within home 65. For example, server 80 may be placed in a den, user television equipment 81 may be placed in a children's room, user television equipment may be placed in a living room, user television equipment 83 may be placed in a parents' room. Communication paths 85 may be any in-home network suitable to transmit video, audio and data, such as dedicated cable fiber optics, firewire links, RF links, etc. As, in the examples of FIGS. 4a, 4b, and 4c, different communications path arrangements such as buses, rings and the like, may be used to interconnect user television equipment based on a client-server architecture.

Figure 6:
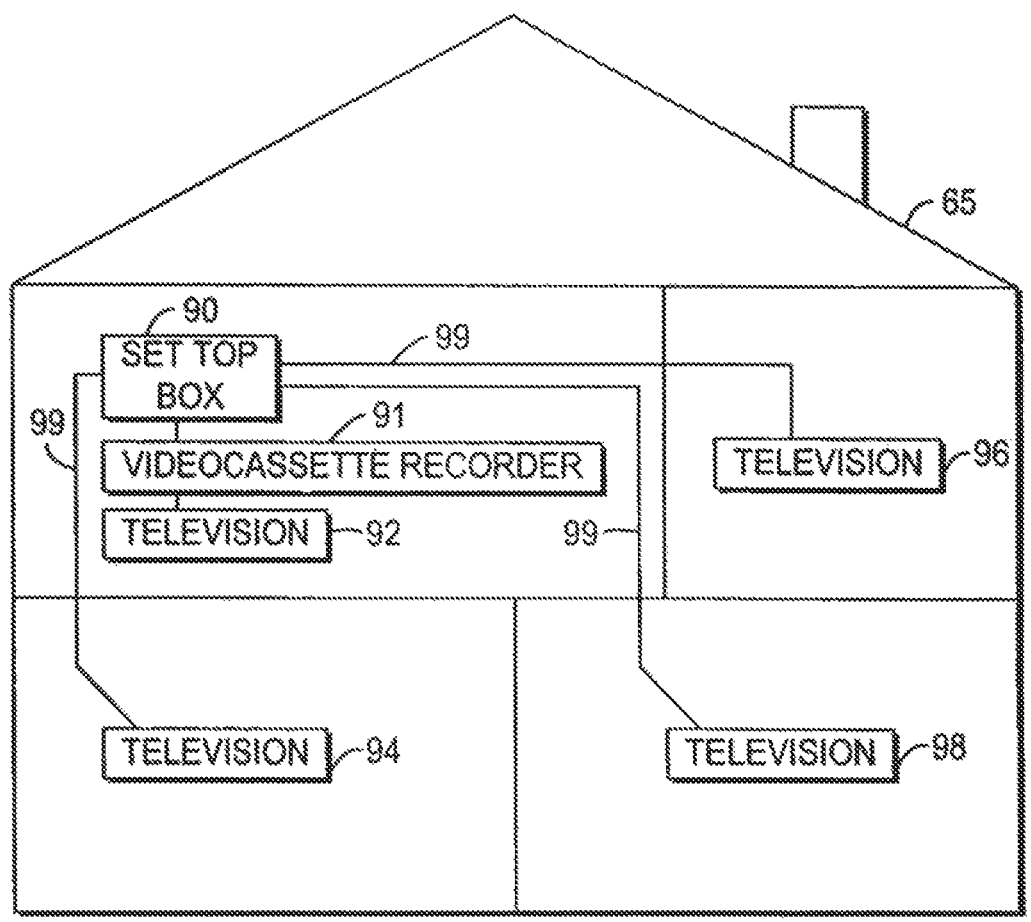
FIG. 6 is a diagram of a system in which multiple interactive television program guides are implemented in a client-server configuration and in which the set-top-box acts as the server in accordance with the present invention.

FIG. 6 shows an illustrative configuration based on a single set-top box. Set-top box 90 is connected to optional videocassette recorders 91 and televisions 94, 96, and 98 via communication paths 99. Optional videocassette recorder 91 is in turn connected to television 92. If desired, any combination of televisions with or without videocassette recorders and televisions may be connected in a similar manner. The set-top box, videocassette recorders and televisions of FIG. 6 may be placed in rooms within home 65. For example, set top box 90, videocassette recorder 91 and television 92 may be placed in a parent's bedroom, television 94 may be placed in a children's room, and television 96 may be placed in a living room, and television 98 may be placed in a guest room. Communication paths 99 may be any in-home network paths suitable for transmitting video, audio and data, such as, dedicated cable, fiber optics or firewire links.

FIGS. 7a, 7b, 7c, 8, and 9 show illustrative configurations for the connection between the home and the television distribution facility. Only one user television equipment device is shown in the households in FIGS. 7a, 7b, 7c, 8, and 9 to avoid over-complicating the drawings. However, each household 65, 101, 102, 103, 104, 401, and 402 in FIGS. 7a, 7b, 7c, 8, and 9 may contain multiple pieces of user television equipment configured as shown in FIG. 3, 4a, 4b, 4c, 5, or 6.

Figure 7A:
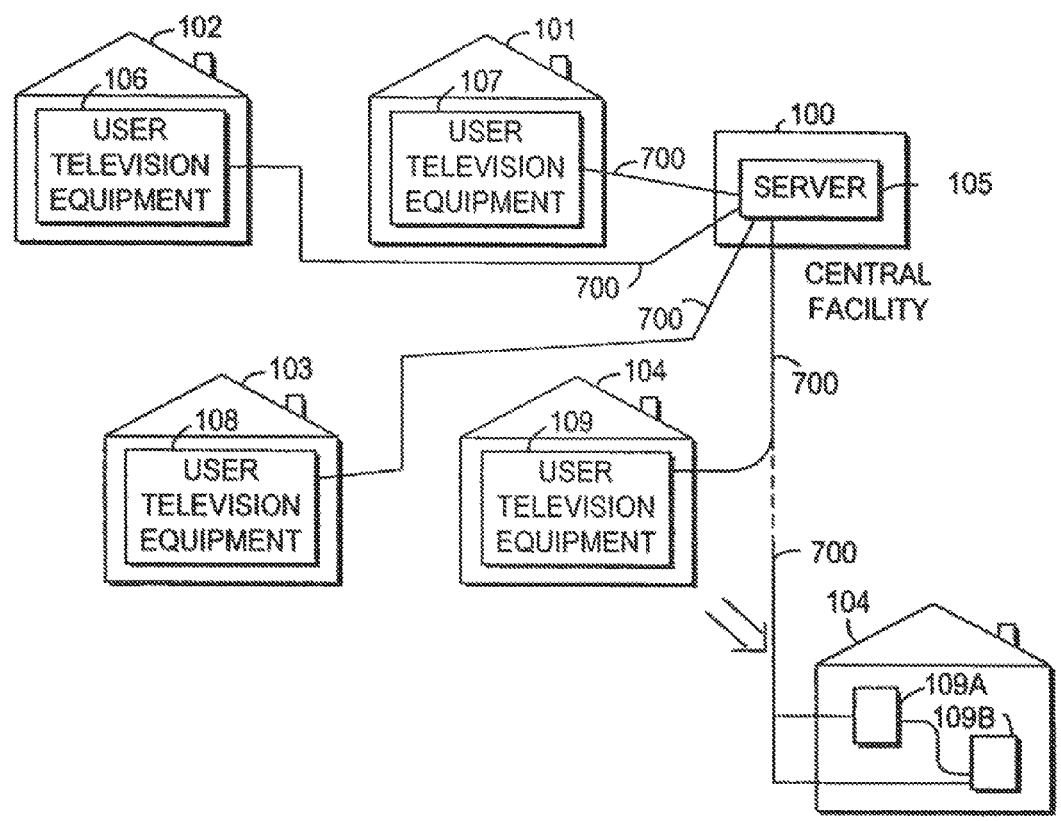
FIG. 7a is a diagram of a system similar to the system of FIG. 1 in which multiple interactive television program guides are implemented in a neighborhood node configuration in accordance with the present invention.

FIG. 7a shows an illustrative configuration in which multiple homes are handled by a common server. Server 105 may be located at central facility 100. Central facility 100 may be a private home, a commercial building, a network node, or other suitable structure that may be connected to a plurality of homes. In the example of FIG. 7a, server 105 is connected to user television equipment 106, 107, 108, and 109 that is located in homes 101, 102, 103, and 104, respectively via communication paths 700. When multiple user television equipment devices exist within a home as shown by devices 109a and 109b, each user television equipment device may communicate with the server 105 independently via communication paths 700, alternatively only one device may communicate while the other communicates via a home network. In other words, in alternative arrangements, there are either 1) multiple connections to an outside server and each user television equipment device communicates with the server independently with no need for an in-home network, or, 2) only one connection to an outside server and each user television device communicates with each other through an in-home network.

Figure 7B:
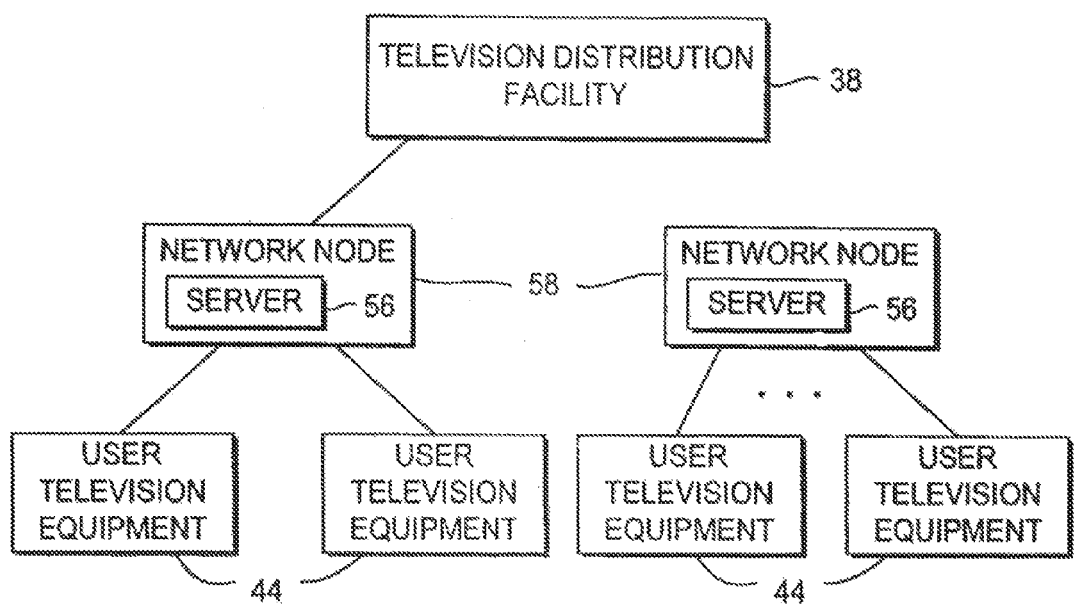
FIG. 7b is a diagram of a system similar to the system of FIG. 1 showing how servers may be located at network nodes in accordance with the present invention.

As shown in FIG. 7b, the capabilities of server (FIG. 1) may be provided using servers 56 located at network nodes 58. Servers such as servers 56 may be used instead of server 42 or may be used in conjunction with a server 42 located at television distribution facility 38.

Graphics information for messages, advertisements and the like may be downloaded periodically (e.g., once per day) to set-top boxes 48 of FIG. 1 and stored locally. The graphics information may be accessed locally when needed by the program guides implemented on set-top boxes 48. Graphics information may also be provided in a continuously-looped arrangement on one or more digital channels on paths 46. With such a continuously-looped arrangement, a map indicating the location of the latest graphics information may be downloaded periodically to set-top boxes 48 (e.g., once per day) or continuously. This allows the content on the digital channels to be updated. The program guides on set-top boxes 48 may use the map to locate desired graphics information on the digital channels. Another approach involves using a server such as server 42 or servers 56 (FIG. 7b) to provide the graphics information after a set-top box 48 and that server have negotiated to set up a download operation. A bitmap or other suitable set of graphics information may then be downloaded from the server to the set-top box. If desired, the server may download instructions informing the set-top box where the desired graphics information can be located on a particular digital channel. The graphics information can be updated periodically if the server that is responsible for downloading the instructions for informing the set-top box of the location of the graphics information is also updated periodically.

Text information for messages, advertisements and the like may be provided to set-top boxes 48 using the same paths that are used for distributing program guide data. For example, advertising data from database 36 of FIG. 1 may be provided to set-top boxes 48 using link 40, television distribution facility 38, and paths 46. The text information may be stored locally in set-top boxes 48 and updated periodically (e.g., once per day).

Text information, graphics information, and videos for messages, advertisements and the like may also be distributed using a combination of these techniques or any other suitable technique.

Figure 7C:
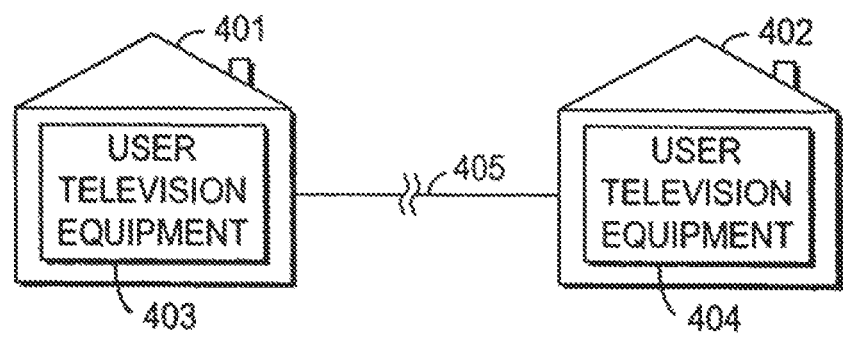
FIG. 7c is a diagram of a system similar to the system of FIG. 1 showing how homes may be connected by modem links in accordance with the present invention.

As shown in FIG. 7c, when a household has more than one home, the user television equipment in each home may be connected by modem link or other suitable link for transferring data between homes. For example, user television equipment 403 may be connected to user television equipment 404 via link 405. Link 405 may use internal or external modems, cable modems or other communications devices suitable for transmitting audio, video, and text data. In this manner, home 401 and home 402 may share program guide settings.

Figure 7D:
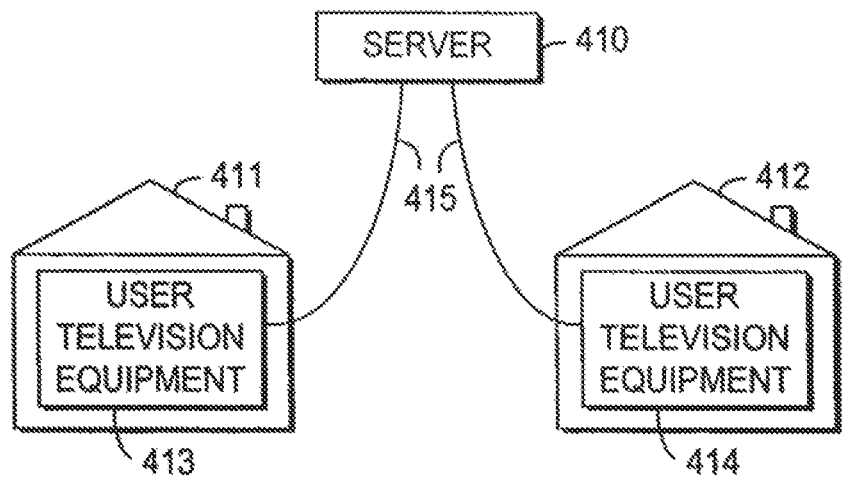
FIG. 7d is a diagram of a system similar to the system of FIG. 1 showing how homes may be connected via a server in accordance with the present invention.

As shown in FIG. 7d, when a household has more than one home, the user television equipment in each home may be connected via an outside server. For example, user television equipment 413 may be connected to user television equipment 414 via server 410. Communication paths 415 may use internal or external modems, cable modems or other communications devices suitable for transmitting audio, video, and text data. In this manner, home 411 and home 412 may share program guide settings.

Figure 8:
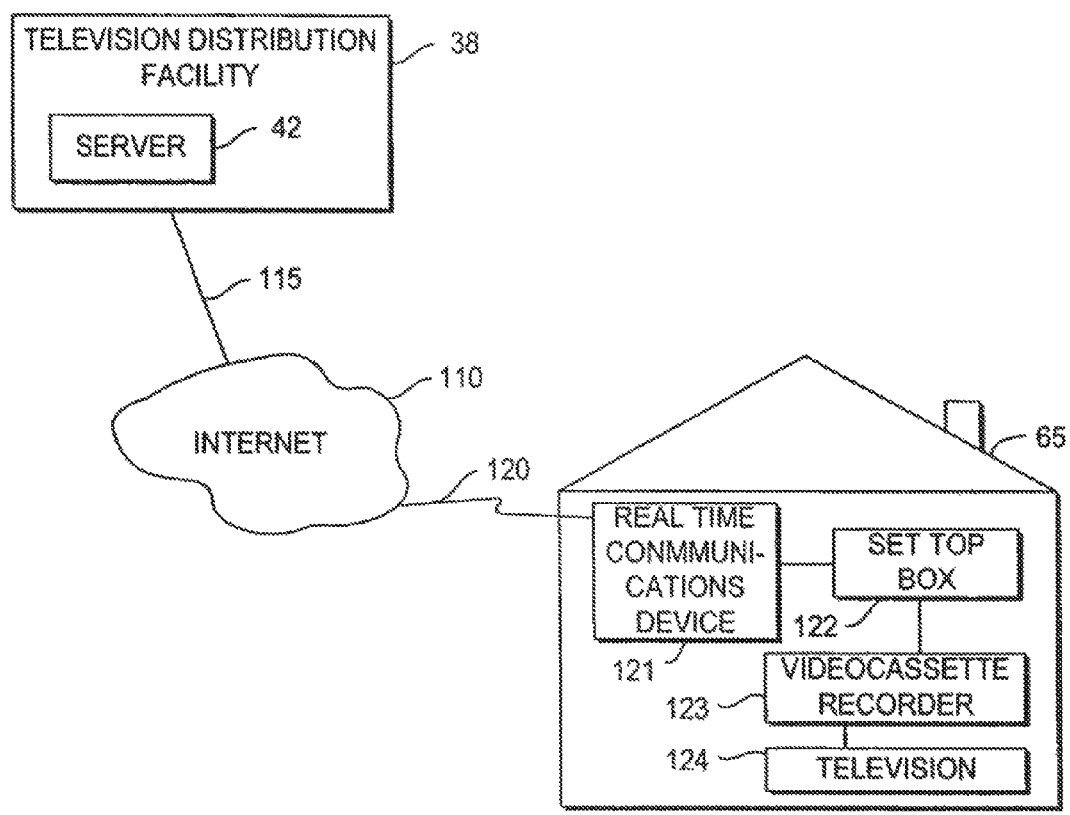
FIG. 8 is a diagram of a system in which multiple interactive television program guides are implemented and in which each such guide uses a real-time communications device connected to the Internet in accordance with the present invention.

FIG. 8 shows an illustrative configuration in which a server is connected to the home via the Internet. Set top boxes 122 are connected to the Internet 110 or other suitable data network in real time using real-time communications devices 121. Videocassette recorders 123 may be connected between set-top boxes 122 and televisions 124. Real-time communications devices 121 may be any devices suitable for maintaining a constant open connection with network 110, such as internal or external modems, cable modem, or the like. The network used to connect homes to television distribution facility 38 may be any network suitable for distributing video and audio data such as the Internet. Network 110 is connected to television distribution facility 38 by communications link 115 and is connected to real-time communications device 121 by communications links 120.

Figure 9:
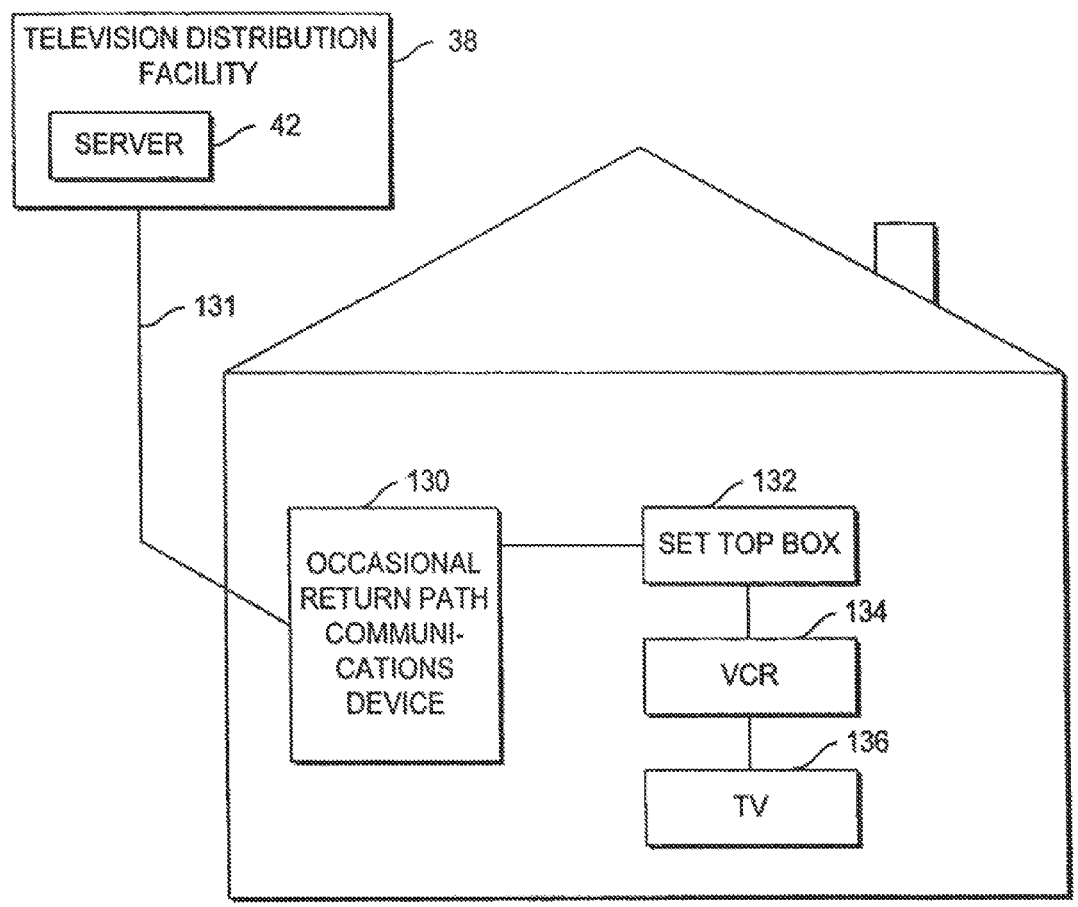
FIG. 9 is a diagram of a system in which multiple interactive television program guides are implemented with an occasional return path communications device in accordance with the present invention.

FIG. 9 shows an illustrative configuration in which user television equipment is linked to a server outside the home via an occasional return path. Set top box 132 is connected to occasional return path communications device 130 and videocassette recorder 134. Videocassette recorder 134 may be connected to television 136. Occasional return path communications device 130 may be any device suitable for connecting set-top box 132 to a server for the transfer of video and audio data, such as an internal or external modem, cable modem, or the like. Occasional return path communications device 130 server 42 which may or may not be connected to television distribution facility 38 using a communications path 131. Communications path 131 may be, for example, a telephone link or other non-dedicated communications path suitable for providing an occasional return path to home 65 from server 42.

Figure 10:
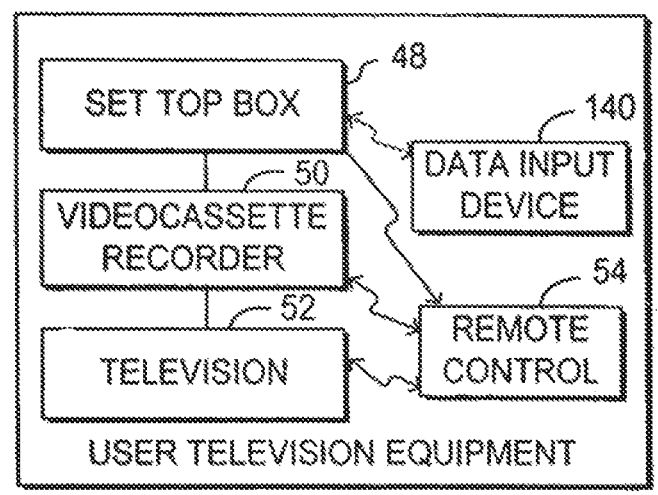
FIG. 10 is a diagram of illustrative user television equipment with an optional data input device in accordance with the present invention.

FIG. 10 shows illustrative components for user television equipment 44 (FIG. 1). In the arrangement of FIG. 10, set top box 48 is connected to data input device 140. Data input device 140 may be a keyboard, keypad, or any device suitable for inputting text (wired or wireless), audio or video. Videocassette recorder 50 is connected to set-top box 48 and television 52. Remote control 54 is used to control the operation of set-top box 48, videocassette recorder 50, and television 52.

Further aspects of the invention are described in detail below. For clarity, the principles of the invention described below are described in the context of the device configuration shown in FIG. 3 and the steps illustrated of FIG. 2, except where noted. However, the principles of the present invention also apply to configurations such as those shown in FIGS. 4-9. Also, the foregoing description is merely illustrative of the principles of this invention and various modifications can be made by those skilled in the art without departing from the scope and spirit of the invention.

In any of the above arrangements, an interactive television program guide on each user television equipment device may provide various features for displaying television program listings information for the user and for providing various program guide functions such as parental control, favorites, pay-per-view purchasing, etc. For example, if the user presses the appropriate buttons on remote control 54, the user may be presented with a time-ordered or channel-ordered grid or table of television program listings or other such programming information.

With one suitable approach, the user may select one of the user television equipment devices to be a master or primary device. Adjusting the program guide settings of the master device controls these settings for all other devices in the household. For example, with the arrangement of FIG. 3, the user may set primary user television equipment 60 to be the master device. Primary user television equipment 60 may be located in the parents' bedroom. This allows the head of the household to control the program guide settings for all of the program guides in the household from a single location.

The system may provides the user with an opportunity to assign a master device, such as user television equipment 60, that will coordinate its program guide settings with other devices such as secondary user television equipment 61, 62, and 63. The system also provides the user with an opportunity to assign secondary devices.

Figure 11:
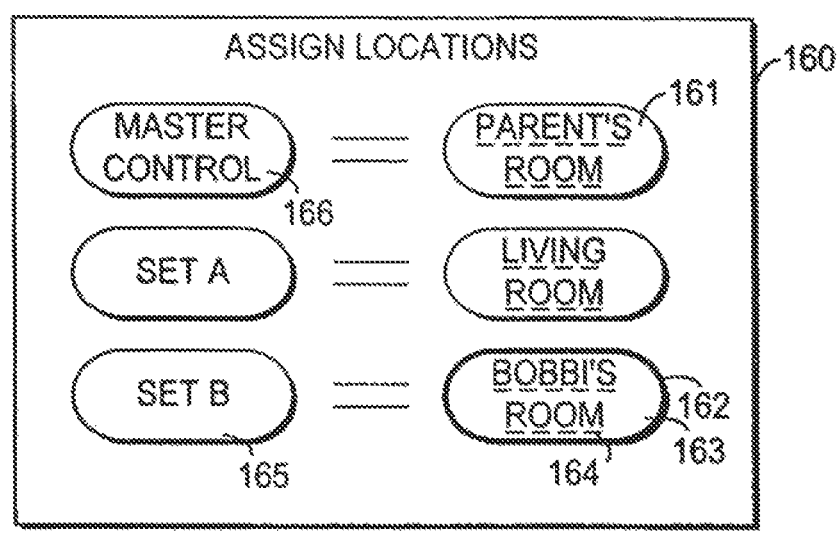
FIG. 11 is a depiction of an illustrative location selection screen in accordance with the present invention.

One suitable way in which the system may allow the user to assign devices as primary (master) and secondaries is for at least one of the program guides (e.g., the program guide running on set-top box 60) to provide an assign locations screen such as assign locations screen 160 of FIG. 11. Screen 160 may be accessed, for example, by first accessing main screen 170 of FIG. 12 (by pressing, e.g., a suitable key on remote control 54). After accessing screen 170, the user can use remote control 54 to move highlight region 177 to the setup option 179 and select setup option 179 by pressing a select key, enter key, "OK" key, or other such key (sometimes referred to herein as simply an enter key) on remote control 54.

Figure 31:
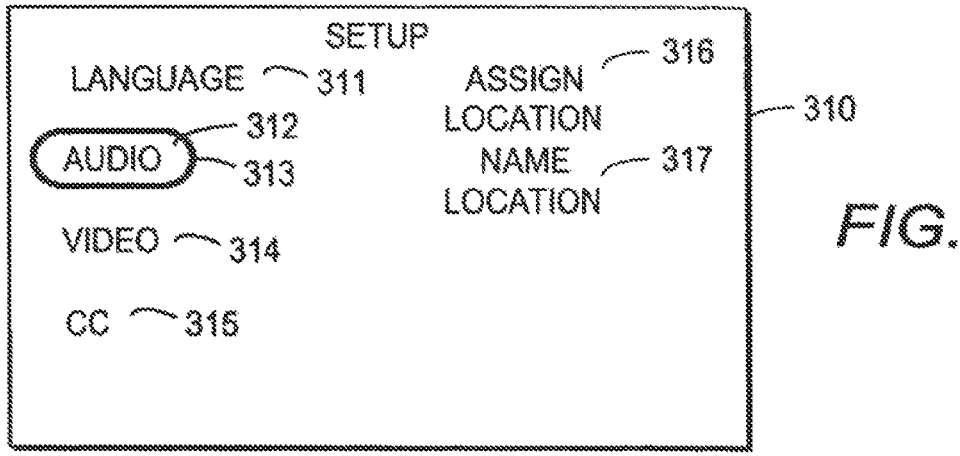
FIG. 31 is a depiction of an illustrative setup screen in accordance with the present invention.

Selecting setup option 179 directs the program guide to display a setup screen such as setup screen 310 of FIG. 31. The user can select assign location option 316 on setup screen 310 by moving highlight region 312 and pressing the enter key. Selecting assign location option 316 directs the program guide to display assign locations screen 160 of FIG. 11. The user can then move highlight region 162 to set B option 165. Selecting option 165, directs the program guide to provide the user with an opportunity to enter a name to assign to set B. For example, the user may use data input device 140 or remote control 54 to enter letters 164 associated with the selected name. The program guide may use such user-defined device names when the relationship between devices is set up. For example, the user may designate the "parents room" location as a master location and may designate the "children's room" location as a slave location. The names of locations may be pre-set by a service provider and simply assigned by the user. Alternately the user (or an installation technician), may have the ability to assign locations from the home. The location name may be chosen from a list as above or typed in by the user (or an installation technician.)

In the alternative arrangement shown in FIG. 4, each piece of user television equipment 66, 67, 68, and 69 is a peer. The user can assign names to each such user television equipment device in much the same way that names may be assigned to the secondary devices in the FIG. 3 arrangement.

Figure 13:
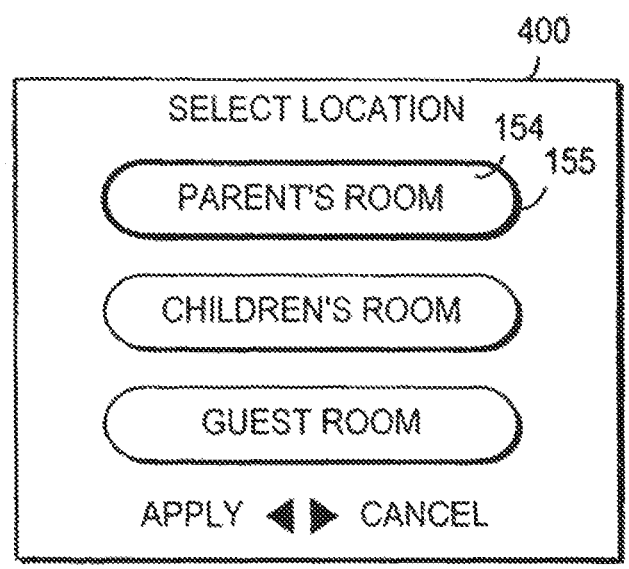
FIG. 13 is a depiction of another illustrative location selection screen in accordance with the present invention.
Figure 14:
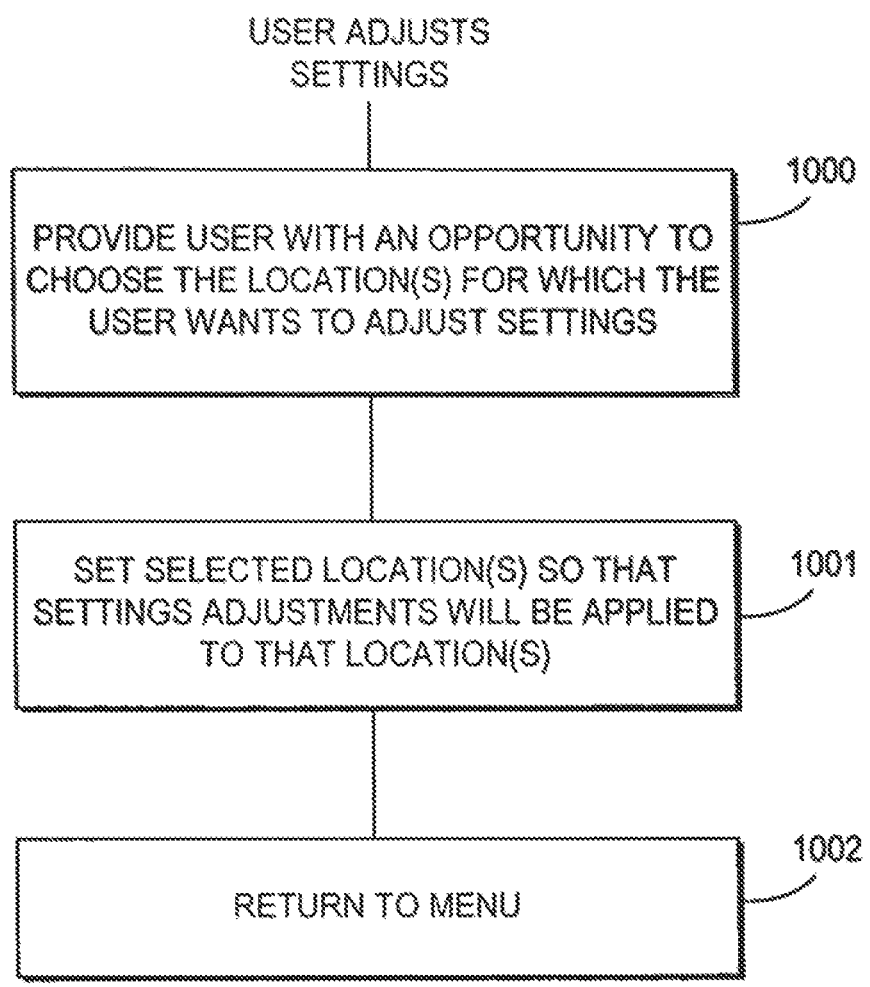
FIG. 14 is a flow chart showing steps involved in an illustrative approach for selecting a location for which to adjust settings in accordance with the present invention.

As shown in FIG. 14, at step 1000, the program guide may provide the user with an opportunity to select the devices or locations for which the user desires to adjust settings. Step 1000 may, for example, involve providing a screen such as select location screen 400 of FIG. 13. At step 1001 of FIG. 14, after the user has made a selection by moving highlight region 155 (FIG. 13) to the desired device (e.g., parents' room option 154) and pressed the enter key, the program guide sets the selected locations. The guide may also default to a particular location based on the type of setting that is changed. (e.g., if a setting for the recording of a program is changed, the guide may default to location with a videocassette recorder.) The guide may default to any combination of locations based on the type of setting that is changed. There are also "other factors" that may be used by the guide to determine at which location the settings will be effective. These include: the current location of the user making the adjustment, whether a location to be adjusted is currently being used, the state of other settings, etc. At step 1002, the program guide may return to a menu (e.g., menu 170 in FIG. 12).

The program guide may allow a unique number to be assigned to a user so that he or she is able to access his or her program guide settings at a location outside the home. For example, a user may visit a neighbors home to housesit while the neighbor is out of town. This user has the ability to log on to the program guide at the neighbors home and access his or her personal program guide settings.

The program guide may allow the user to set parental controls to prevent children from viewing potentially inappropriate material. At step 1010 of FIG. 17, for example, the program guide may provide the user with an opportunity to access main screen 170 of FIG. 12. On Main screen 170, the user may use remote control 54 to move highlight region 177 to the parental control option 176 and select that option by pressing the enter key.

Figure 15:
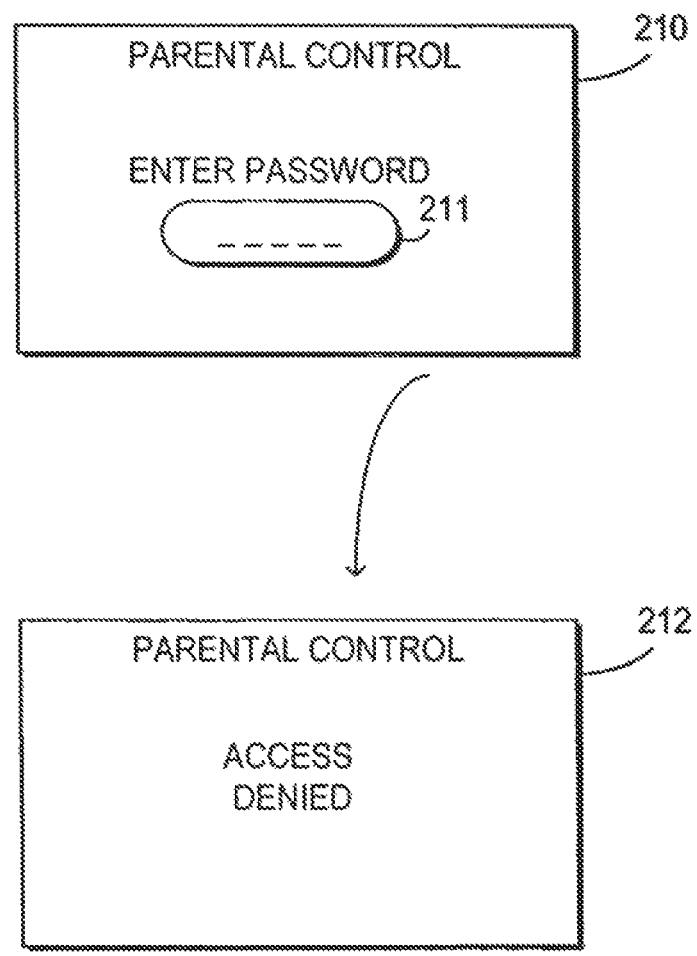
FIG. 15 is a depiction of an illustrative parental control password screen and an illustrative corresponding parental control access denied screen in accordance with the present invention.
Figure 16:
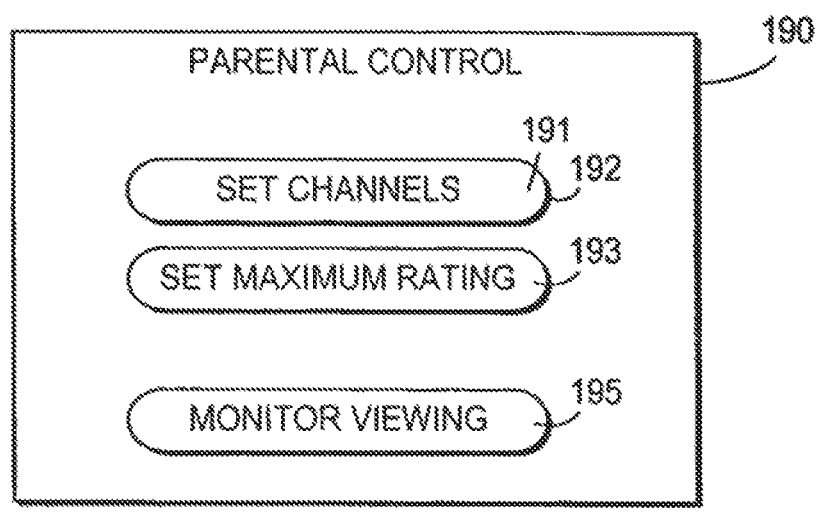
FIG. 16 is a diagram of an illustrative parental control screen in accordance with the present invention.
Figure 17:
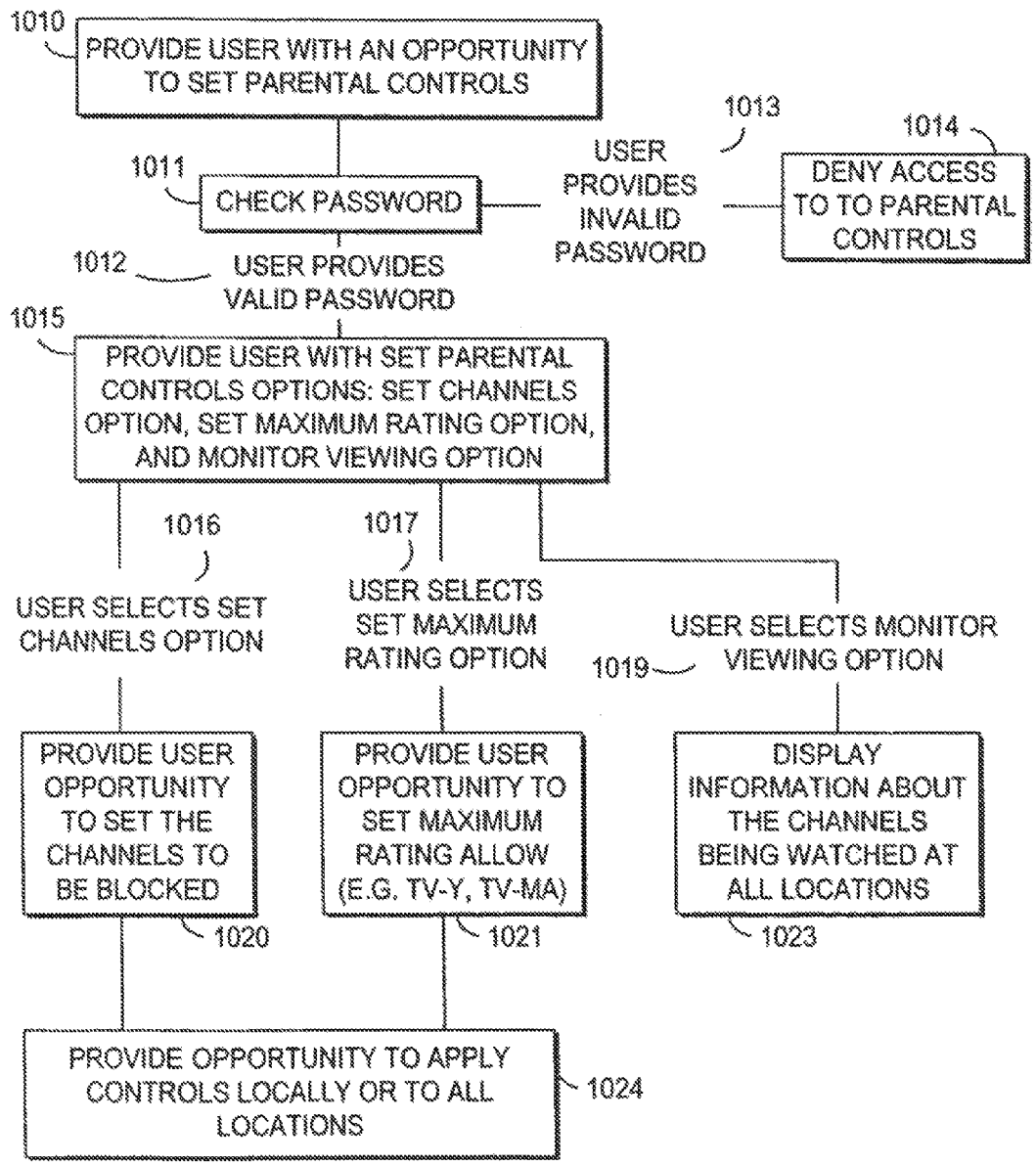
FIG. 17 is a flow chart showing steps involved in an illustrative approach for applying parental controls in accordance with the present invention.

At step 1011 of FIG. 17, after the user has entered a preselected password 211 (FIG. 15) on enter password screen 210 of FIG. 15, the program guide checks the password. If the wrong password was provided at step 1013, then the user is shown invalid password screen 212 of FIG. 15 and is denied access to parental control screen 190 of FIG. 16 at step 1014 of FIG. 17, and may be returned to main menu screen 170 of FIG. 12. If the user has provided a valid password at step 1012, the program guide provides various options at step 1015. At step 1015, the user can access parental control screen 190 of FIG. 16 and may use remote control 54 to navigate between options such as set channels option 191, set maximum rating option 193, and monitor viewing option 195. The user may navigate to set channels screen 200 of FIG. 18a by selecting set channels option 191 at step 1016 of FIG. 17 by moving the highlight region 192 and pressing select.

If the user selects set channels option 191 at step 1016, at step 1020 the program guide provides the user with an opportunity to set which channels are to be blocked. The user may block specific channels using remote control 54 to scroll through and select from channel options 201, 202, 203, and 204 of FIG. 18a. For example, the user may move highlight region 207 to channel option 201 (which may be an adult channel). The user can then toggle between blocking and not blocking the channel by pressing the enter key on remote control 54.

Figure 18A:
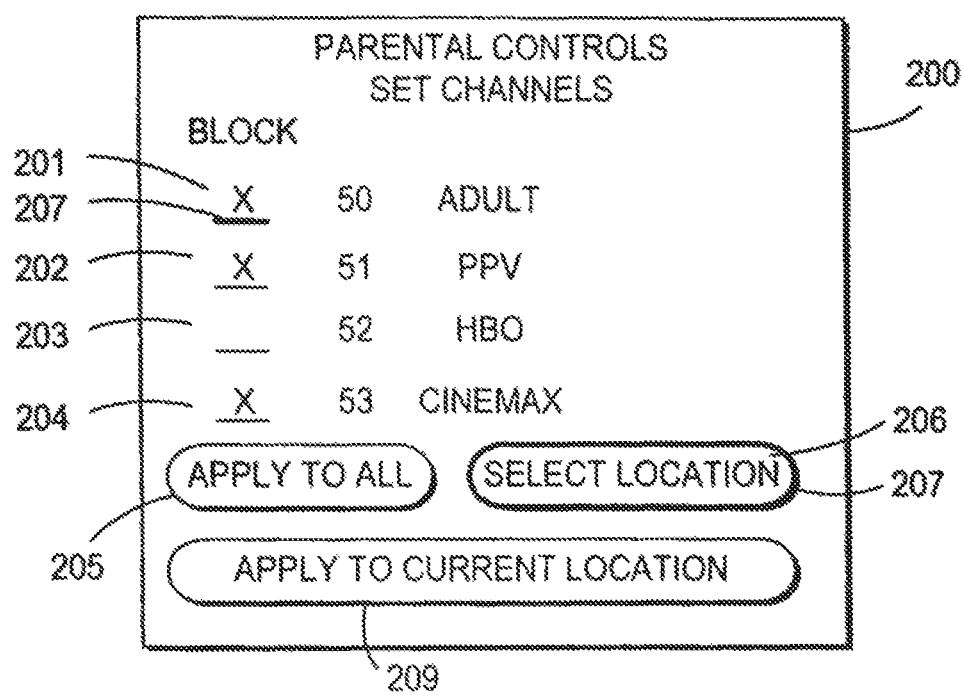
FIG. 18a is a depiction of an illustrative parental controls set channels screen in which selected channels are blocked in accordance with the present invention.

In screen 200 of FIG. 18a, a blocked channel is represented by an X. The user can choose to apply the parental controls selected in screen 200 of FIG. 18a to all locations by selecting apply to all option 205, choose to apply to the current location by selecting current location option 209, or can choose to apply the controls to a specific location or locations by selecting the select locations option 206 from the option provided by the program guide, at step 1024 of FIG. 17. The guide may apply the settings to a default location or to a location determined by other factors as described above.

Figure 18B:
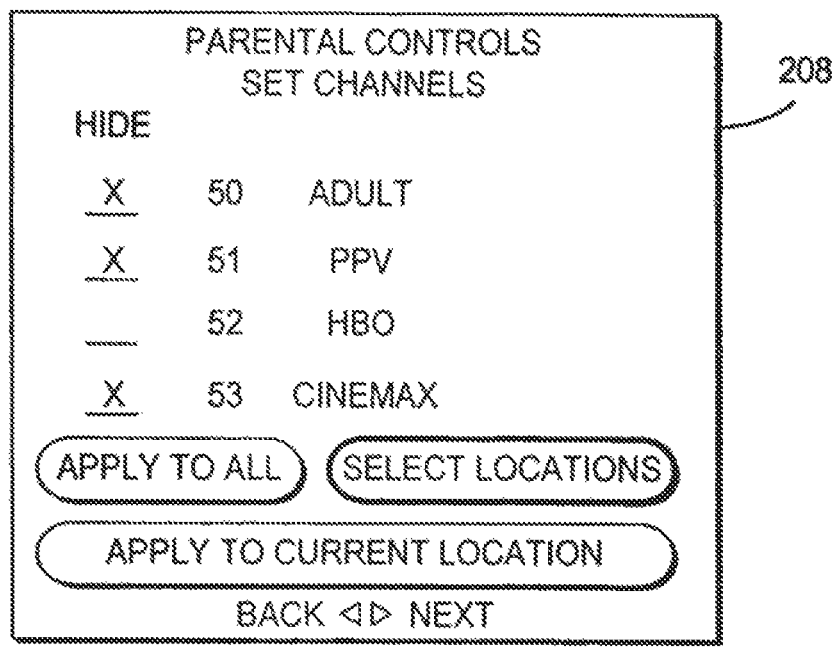
FIG. 18b is a depiction of an illustrative parental controls set channels screen in which selected channels are hidden in accordance with the present invention.

FIG. 18b shows an illustrative parental controls set channels screen 208 that may be used when it is desired to hide controlled channels rather than merely blocking them. When the user chooses to hide the channels, the blocked channels do not appear on any of the program listings display screens provided by the program guide.

The user may also navigate to a set maximum ratings screen by choosing set maximum rating option 193 of FIG. 16, at step 1017 of FIG. 17, by moving a highlight region and pressing select. At step 1021 of FIG. 17, the user may then set a maximum rating allowed for viewing in a manner similar to the set channels option. For example, the user may move a highlight region to a set maximum rating option (which may be TV-MA), then the user can enter his selected maximum using remote control 54. Next, the user can choose to apply the adjustments to all locations by selecting an apply to all option or may opt to apply the adjustments to a specific location or locations by selecting a select locations option from the options provided by the program guide, at step 1024 of FIG. 17. The guide may apply the settings to a default location or to a location determined by other factors as described above.

Figure 19:
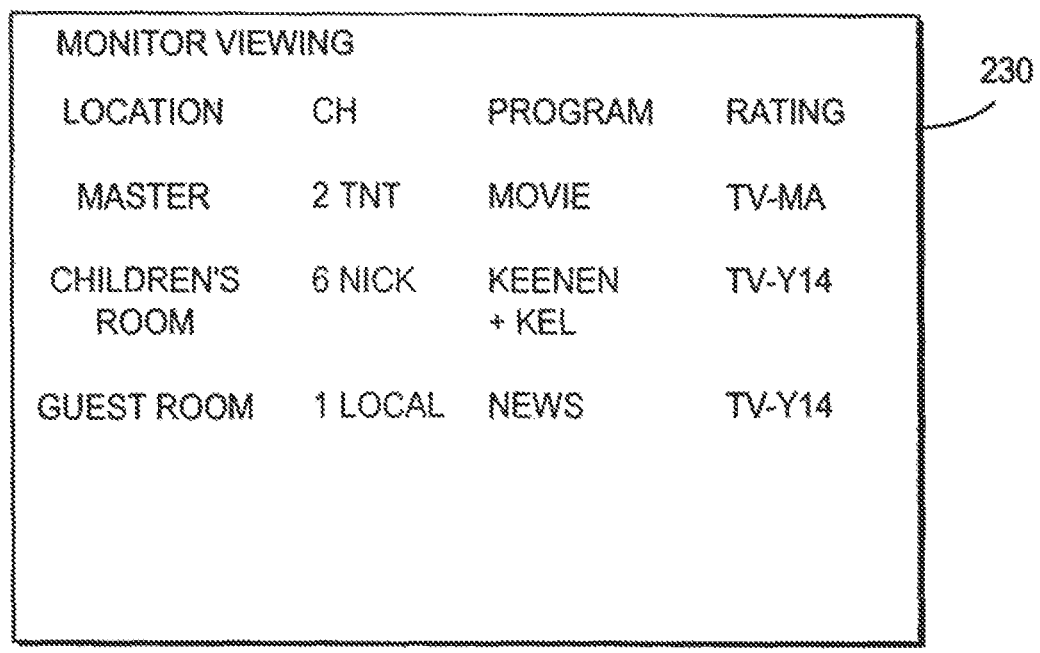
FIG. 19 is a depiction of an illustrative monitor viewing screen in accordance with the present invention.

The user may navigate to monitor viewing screen 230 of FIG. 19 by choosing the monitor viewing option 195 of FIG. 16 (step 1019 of FIG. 17) by moving highlight region 192 to the monitor viewing option 195 and pressing enter.

At step 1023 of FIG. 17, the program guide at the user's location may then, in one alternative, provide the user with monitor viewing screen 230, which shows the channel that each location is currently viewing or an overlay such as a banner or small information box that shows the channels that the other locations are viewing, but that also allows the user to continue watching programming at the user's location. The program guide at the user's location may poll the program guides at other locations within the household to determine whether anyone is currently viewing television and to which channels they are tuned. The monitor viewing screen may also allow the viewing of video, audio, or still images associated with the channel being viewed at another location. For example, the video of the remote location may be shown in a small box on the screen while the current channel's video is in the background.

The guide may allow the user to change the channel of a remote location. For example, a user in the parents' room may notice that the television in the children's room is tuned to a program the child should not be watching. The user may change the channel without physically going into the child's room.

The guide may also allow a level of privacy to be set for a location so that location cannot be monitored. For example, if guests are visiting a household the monitor feature may be disallowed in the parents' room.

Other parental control features that may be distributed to remote locations within a household include: blocking channels by title, blocking channels by time, blocking channels by content (language, nudity, etc.), blocking the ability to use a feature (e.g., reminders), blocking the ability to set and clear pin numbers, ability to temporarily disable parental controls (e.g., disabling parental controls while the child is at school), and the ability to set pin numbers for individual locations or for the entire household. Additionally, the guide may have the ability to use multiple sets of parental control settings profiles. For example, the user may create a late night profile of parental controls and day time profile of parental controls. The guide then allows the user to designate which parental controls profile to use and when to use it.

Figure 12:
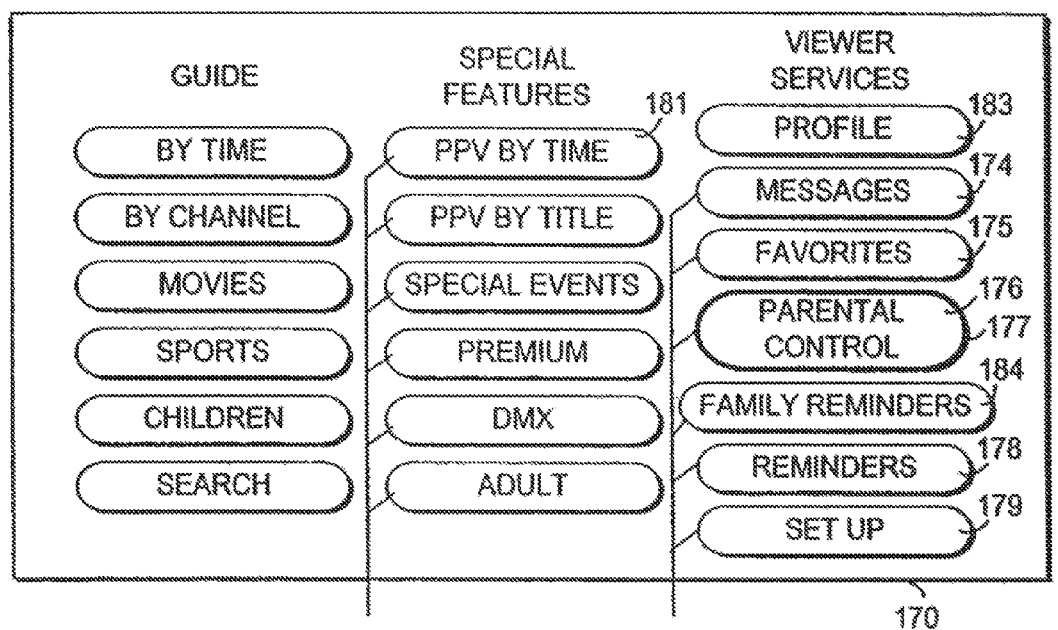
FIG. 12 is a depiction of an illustrative main menu screen in accordance with the present invention.

Another feature that may be provided by the program guide is a reminders feature, which may be accessed by selecting reminders option 178 from the menu of main screen 170 of FIG. 12. The reminders feature allows the user to set a reminder for a television program that the user wishes to watch at a later time. Just before the television program for which a reminder has been set is to be broadcast, a reminder message is displayed on the user's television screen. Reminders may also be provided that direct the program guide to automatically tune the user's set-top box to the program specified in the reminder. Reminders may also provide the user with an on-screen reminder when a selected program begins and may allow the user to manually tune to the selected channel.

A family reminders option may be provided that operates similarly to the reminders functions described above and which allows reminders to be set for a family, which may be accessed by selecting family reminders option 184 from the menu of main screen 170 of FIG. 12. For example, in FIG. 7a server 105 at central facility 100 may store many family reminder settings (or other settings) for individual homes. The program guides in a particular home or household may also provide the ability to adjust favorites settings, parental control settings, reminder settings and the like. These settings may be named and associated with a viewing location, an entire home, or a group of homes.

A series reminder option may be provided that allows users to set reminders for program series. Series reminders are described in Knudson et al. U.S. patent application Ser. No. 09/330,792, filed Jun. 11, 1999, which is hereby incorporated by reference herein in its entirety.

An illustrative example of using the reminders feature is as follows. If a user at one of the program guide locations within the household presses an appropriate button (e.g., the enter button) after having used a browse feature (i.e., a pop-up program listing display 256) to navigate to a program listing 257 for "Holiday Entertaining" as shown in screen 255 of FIG. 20, the program guide at that location may present the user with set reminder screen 350 of FIG. 21. Set reminder screen 350 allows the user to choose to set a reminder for the selected program 352 (Holiday Entertaining) by selecting yes option 354 with highlight region 356 shown at step 1030 of FIG. 23. If the user selects no option 358, set reminder screen 350 is canceled. If set reminder screen 350 is not canceled, the user select the program guide locations (i.e., the locations of the various user television equipment devices within the household) to which the adjustments are to be applied by selecting apply to all option 205, current location option 209, or by selecting the select locations option 206 (step 1031, FIG. 23) and interacting with various sub-menus listing the available locations from which to choose. Set reminder screen 350 and other such screens in the program guide may use either a full-screen or partial-screen display format. After the user selects the program guide locations to which the reminders are to be applied, the program guide at the user's location communicates with the program guides at the user-selected locations. During this communication process, the program guide at the user's location directs the other program guides to set reminders for display at their locations just before the scheduled broadcast time of the program. If desired, the program guide at the user's location can communicate with the program guides at the selected locations using other suitable techniques. For example, the program guide at the user's location may issue instructions to the program guides at the selected locations just before the scheduled broadcast time of the program for which the reminder was set that causes those program guides to display a reminder message at that time. These approaches are merely illustrative. Any other suitable approach for communicating the reminders settings or any other program guide settings from the program guide at the user's location to the other program guides may be used if desired.

Figure 22:
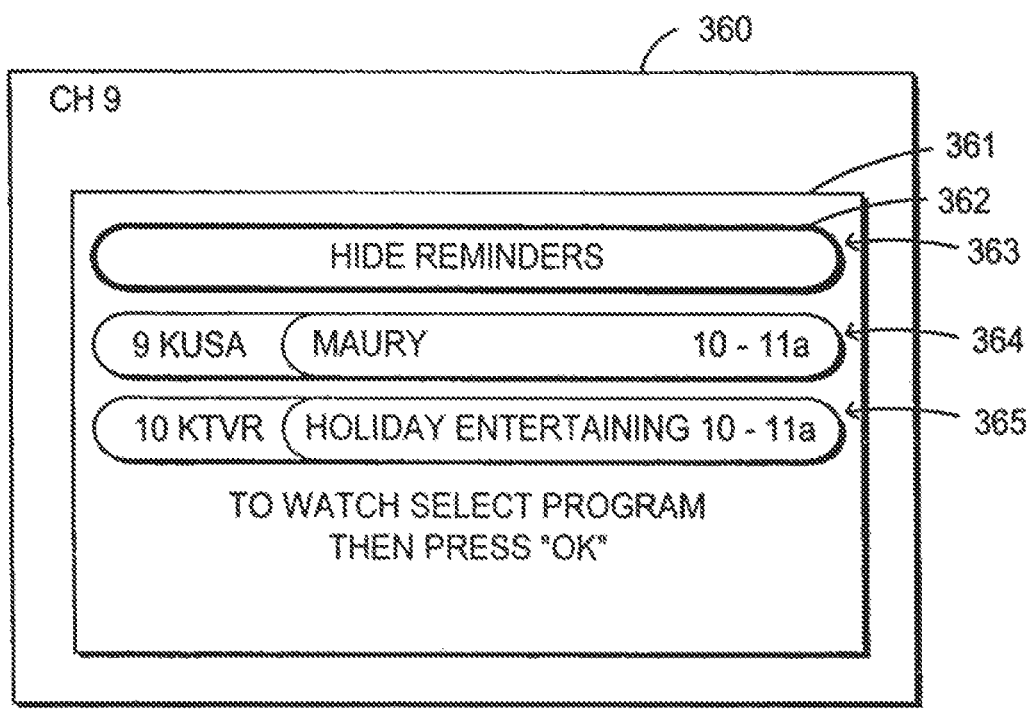
FIG. 22 is a depiction of an illustrative select reminder screen in accordance with the present invention.
Figure 23:
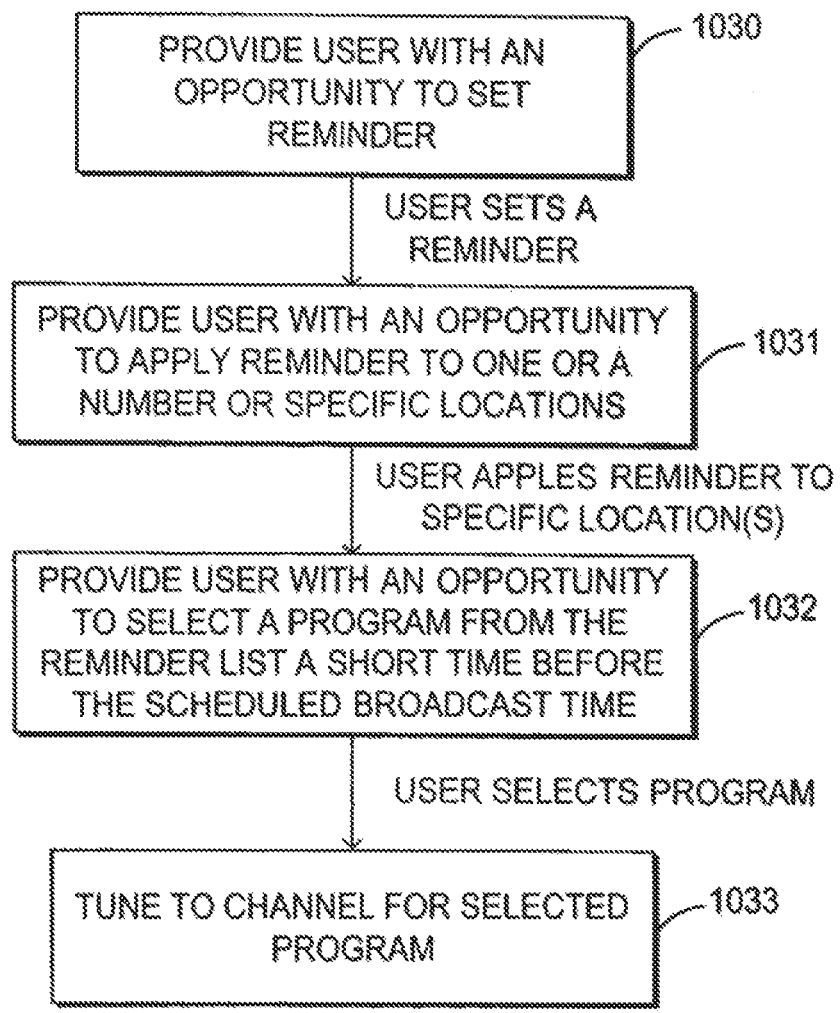
FIG. 23 is a flow chart showing steps involved in an illustrative approach for setting and selecting a reminder in accordance with the present invention.

A short time before the scheduled broadcast time of the program for which a reminder has been set, the program guide at each selected location may display a reminder display region 361 on the television screen 360 at that location (Step 1032; FIG. 23), as shown in FIG. 22. Reminder display region 361 may be displayed as a partial screen overlay over the currently displayed television channel (e.g., channel 9). In the example of FIG. 22, two reminders were set for the 10:00 AM time slot. As a result, reminder display region 361 contains program listings for both selected programs. A user at any of the program guide locations in which the reminder is displayed may automatically tune to one of the selected programs by moving highlight region 362 from hide reminders option 363 to program listing 364 or program listing 365. When the user at that location presses the select button, the set-top box 48 at that location tunes to the channel of the selected program (step 1033, FIG. 23). If the user selects hide reminders option 363, reminder display region 361 is hidden from view. Additionally, reminders may be set to automatically tune to a particular channel without accessing a reminder display region. For example, a parent would have the ability to insure that the children's television automatically tunes to an educational program by setting a reminder for that program.

In addition to the opportunity to set reminders, the user may be provided the opportunity to create profiles to customize the viewing experience, which may be accessed by selecting profiles option 183 from the menu of main screen 170 of FIG. 12. For example, if desired, the program guides may allow each user to establish a profile of settings and other criteria as described, for example, in commonly-assigned Ellis et al. U.S. patent application Ser. No. 09/034,934, filed Mar. 4, 1998, which is hereby incorporated by reference herein in its entirety. With such an approach, users may establish profiles of preferences such as their favorite channels, preferred genres of programming (sports, comedy, etc.), favorite actors, desired or required ratings, etc. In accordance with the present invention, one of the program guides may provide the user with an opportunity to apply this profile to all locations or to apply such settings to a specific program guide location or locations. The guide may apply the profile to a default location or to a location determined by other factors as described above.

The user may also be provided the opportunity to set favorite channels. The program guide at the user's location may display a menu such as the menu of main screen 170 of FIG. 12. The user may then use remote control 54 to navigate to the favorites option 175 using remote control 54 and pressing the enter button.

Figure 24:
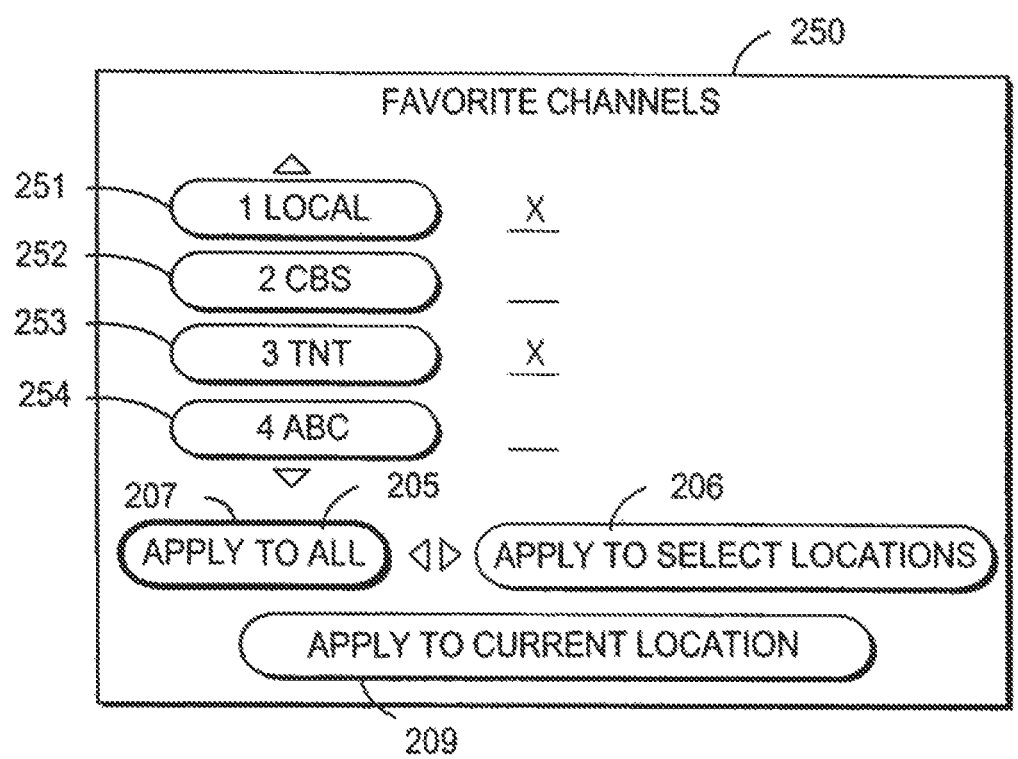
FIG. 24 is a depiction of an illustrative favorite channels screen in accordance with the present invention.

Once the user chooses favorites option 175, the program guide at the user's location may present the user with a favorite channels screen such as favorite channels screen 250 of FIG. 24. The user may move highlight region 207 to a channel such as channel option 251 of screen 250 (which may be a local news channel), channel option 252 of screen 250, channel option 253 of screen 250, or channel option 254 of screen 250. The user can then toggle between selecting and not selecting that channel by pressing the enter key on remote control 54. In the example of FIG. 24, a favorite channel is represented by an X. Next, the user can choose to apply the selected favorites settings to various other program guide locations by selecting apply to all option 205, apply to select locations option 206, or apply to current location 209.

If the user chooses the apply to select locations option 206, the program guide at the user's location provides the user with menu screens from which to select the desired locations to which the favorites settings are to be applied. The desired locations may be set by default or other factors as described above. A parent may want to prevent children from even seeing the titles of objectionable programming.

Figure 20:
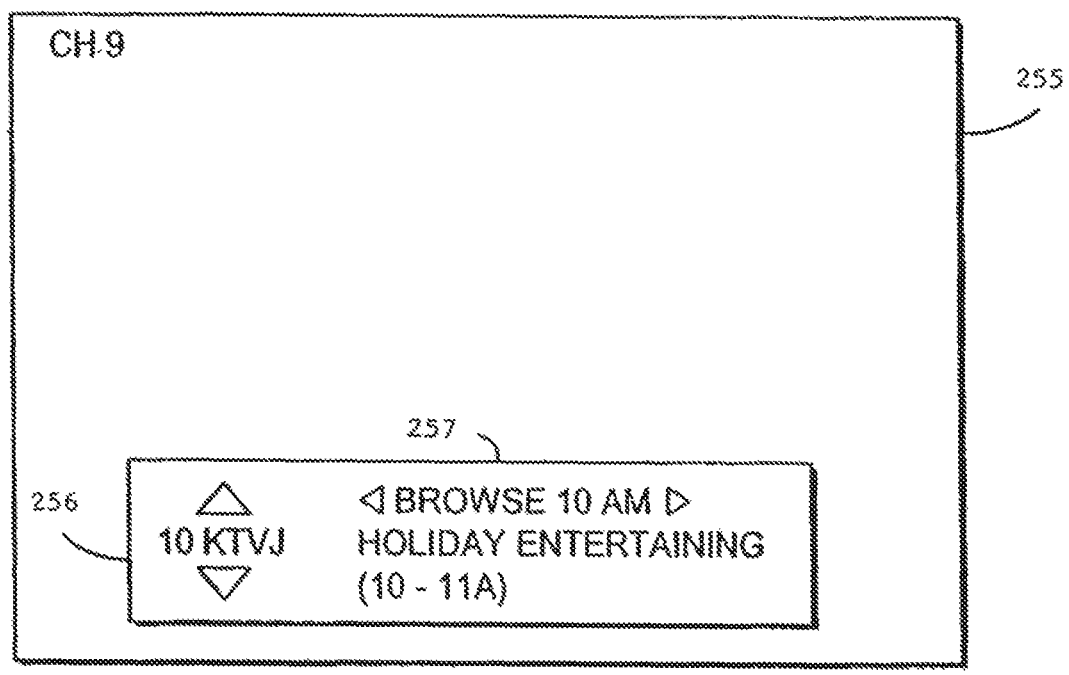
FIG. 20 is a depiction of an illustrative browse screen in accordance with the present invention.
Figure 21:
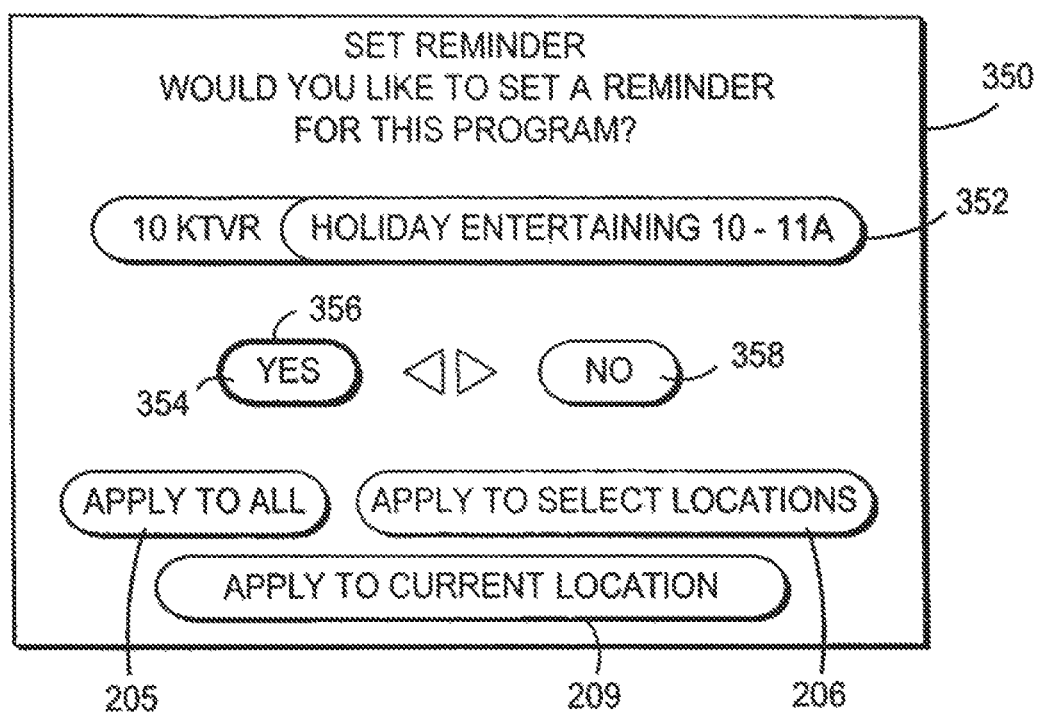
FIG. 21 is a depiction of an illustrative set reminder screen in accordance with the present invention.
Figure 25:
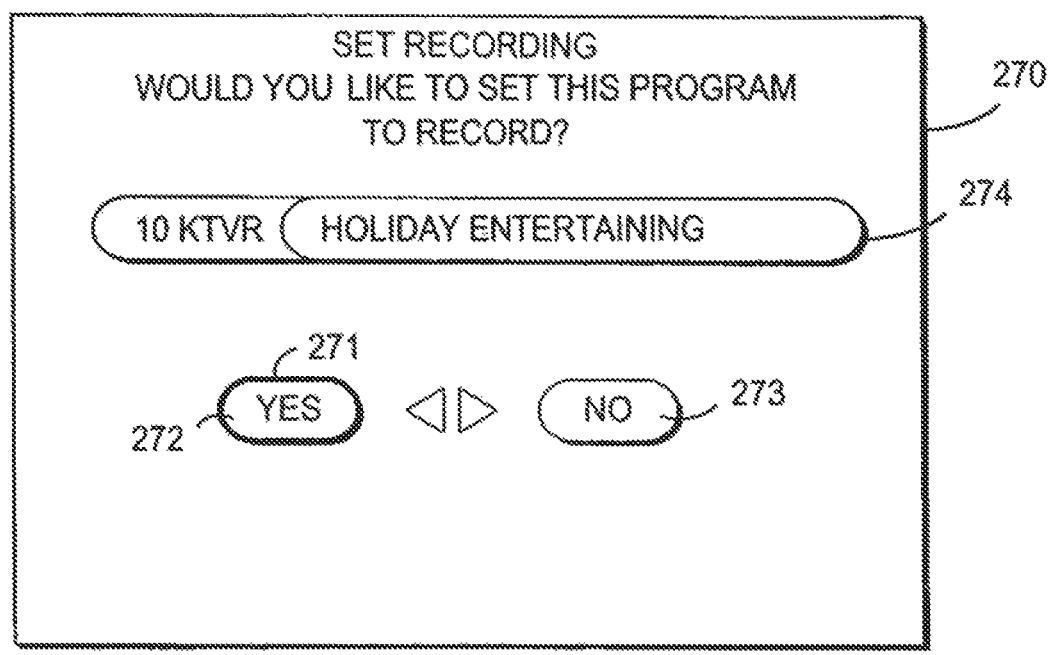
FIG. 25 is a depiction of an illustrative set recording screen in accordance with the present invention.

The user may be provided with an opportunity to select programs for recording at a later time. For example, if the user presses an appropriate button (e.g., a "record" button) after having used a browse feature to navigate to a program listing for "Holiday Entertaining" as shown in FIG. 20, the program guide at the user's location may present the user with a set recording screen such as set recording screen 270 of FIG. 25. Set recording screen 270 allows the user to set a selected program 274 (Holiday Entertaining) for recording by the program guide by selecting yes option 272 with highlight region 271. If the user selects no option 273, set recording screen 270 is canceled.

If a household has only one videocassette recorder 50, there will only be one location that will make all recordings, regardless of which location the recordings are set from. If there are multiple videocassette recorders, the user may be presented with select location screen 400 of FIG. 13 after selecting the yes option 272, that provides the user with an opportunity to select the location that will make the recording. If desired multiple locations may be selected. The guide may choose which VCR is used based on which VCR is busy or based on other factors.

At the scheduled broadcast time of the program to be recorded, the program guide at each selected location causes videocassette recorder 50 to begin recording. After the scheduled completion of the broadcast of the recorded program, each program guide causes its videocassette recorder 50 to stop recording.

The guides may cause videocassette recorders 50 to stop and start recording by sending an IR signal to the videocassette recorders IR input or by, any other suitable method for transmitting a signal to a videocassette recorder.

A series recording option may also be provided that allows users to record program series. Series recording is described in the above-mentioned Knudson et al. U.S. patent application Ser. No. 09/330,792, filed Jun. 11, 1999.

Another example of a program guide feature that benefits from coordination between multiple program guide devices in a household is pay-per-view ordering.

The user may be provided with an opportunity to order pay-per-view programming with a program guide display screen such as main screen 170 of FIG. 12. The user may use remote control 54 to select the pay-per-view by time option 181.

Figure 26:
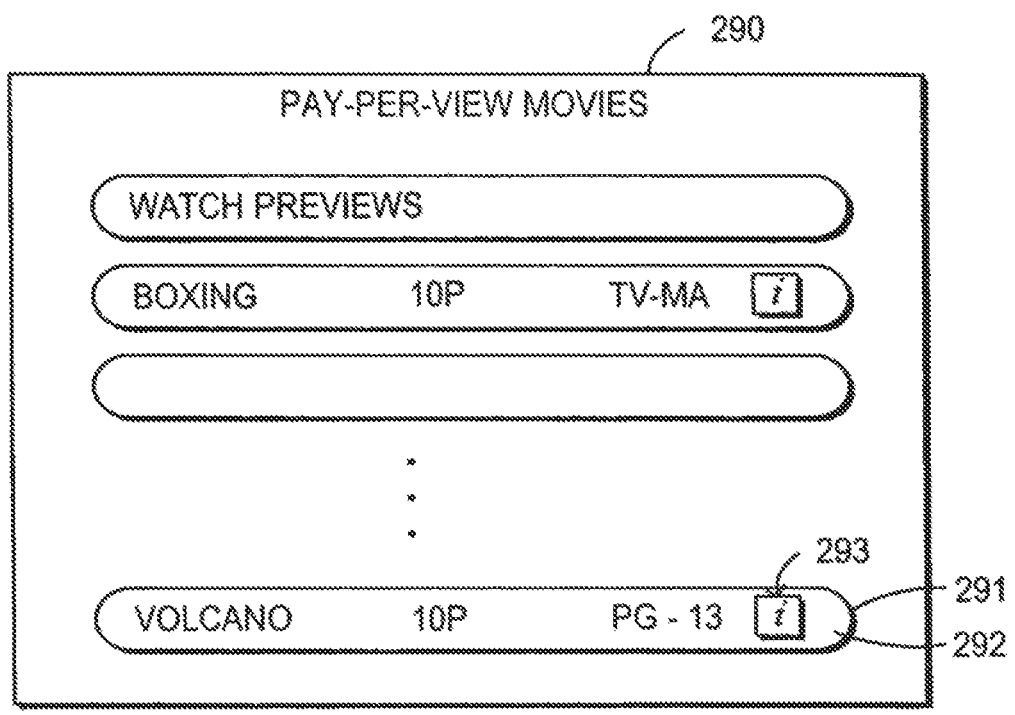
FIG. 26 is a depiction of an illustrative pay-per-view movies screen in accordance with the present invention.
Figure 27:
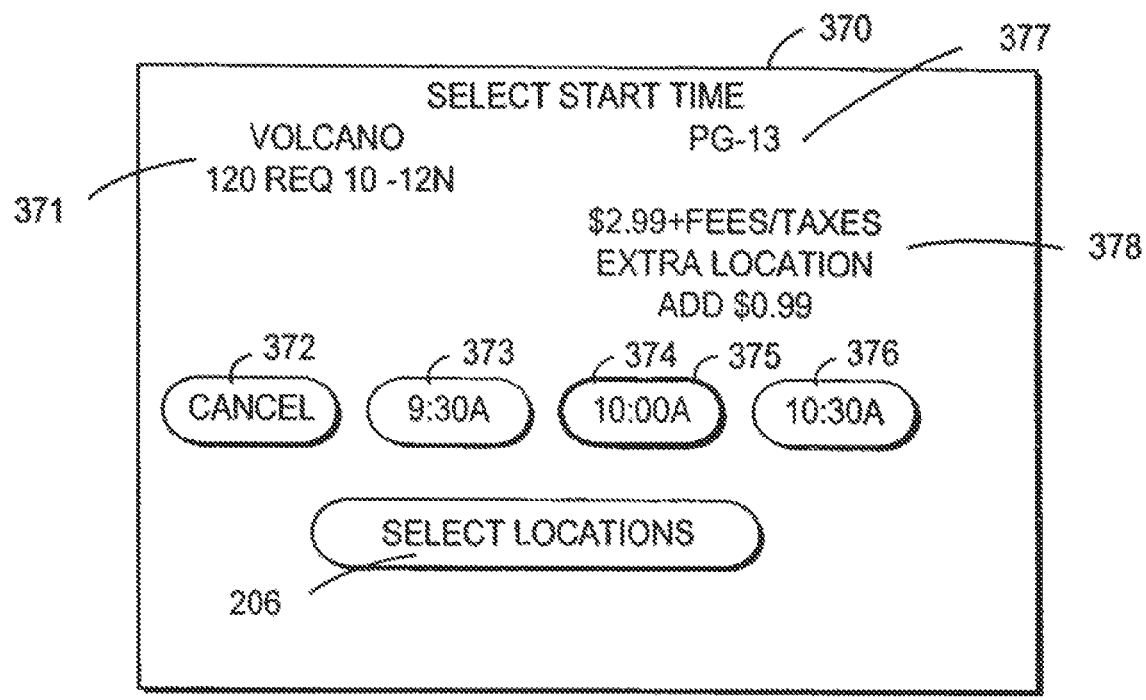
FIG. 27 is a depiction of an illustrative pay-per-view select start time screen in accordance with the present invention.

The user may select a program to order from a screen such as pay-per-view screen 290 of FIG. 26 using remote control 54 to navigate through program options. For example, the user may move highlight region 291 to program listing 292 (which may be for the movie "Volcano" scheduled to be aired at 10:00 PM). The user may then select the program by pressing the enter button on remote control 54. Pay-per-view ordering screens such as pay-per-view ordering screen 370 of FIG. 27 may be used to allow the user to view information on channel 371 on which the program is scheduled to be broadcast, rating 377, price 378 (shown illustratively as involving a surcharge for availability at additional locations within the household), and various available broadcast times 373, 374, and 376. A cancel option 372 allows the user to cancel pay-per-view ordering. The user may select cancel option 372 or a given broadcast time 373, 374, or 376 by placing highlight region 375 on top of the desired option and pressing enter. The user may choose to make the selected program available to various locations within the household by selecting the select locations option 206. Alternatively, the guide may make the program available to a default location or to a location determined by other factors as described above.

Figure 28:
FIG. 28 is a depiction of an illustrative messages receiving screen in accordance with the present invention.

The program guide system may support a messages option, which may be accessed by selecting messages option 174 from the menu of main screen 170 of FIG. 12. Messages may be sent from the service provider at television distribution facility 38 (FIG. 1) and may relate, e.g., to billing matters, general concerns, service issues, etc. Messages may be sent to the main facility or other locations by the Internet or electronic messages or other suitable means. Messages may appear on the television screen of television 52 when received. The appearance may, for example, be in a text box at the bottom of the screen. The user may be provided a list of messages that may be viewed and choose one to view. An indicator may also appear showing that unread messages exist. A messages receiving screen such as messages receiving screen 300 of FIG. 28 may be provided that allows, the user to navigate through a table relating various locations with various types of messaging. For example, the user may move highlight region 301 to the option relating to messages of the billing type for the children's room location. By hitting the enter key the user may toggle between turning such messages on and off. If, in this example, messages are turned on, the children's room would receive billing messages. If messages are turned off, the children's room would not receive billing messages.

Figure 29:
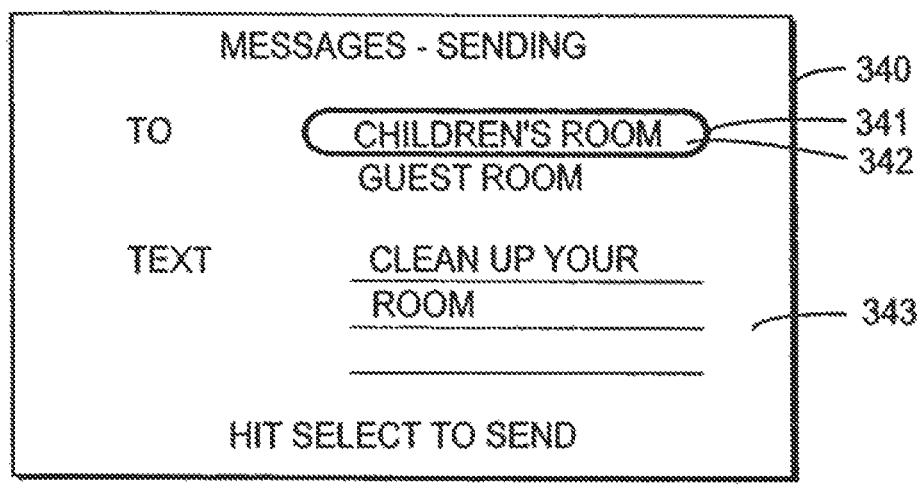
FIG. 29 is a depiction of an illustrative messages sending (user entered) screen in accordance with the present invention.
Figure 30:
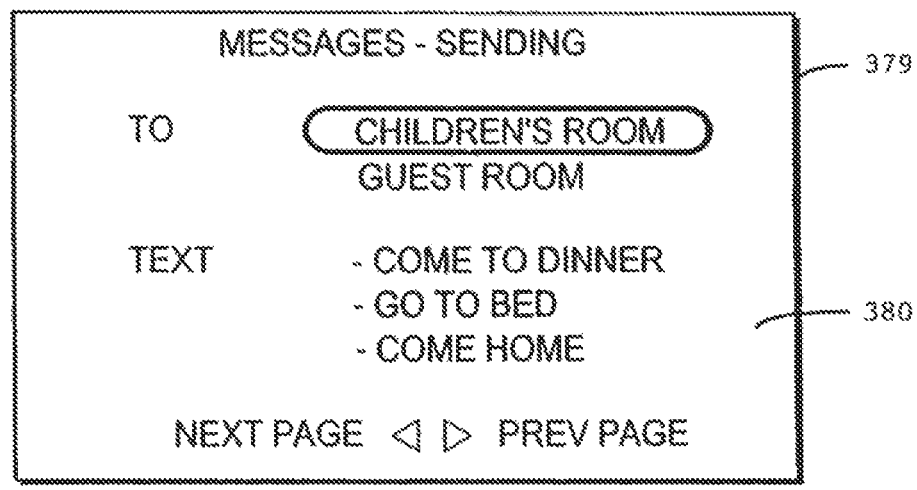
FIG. 30 is a depiction of an illustrative messages sending (pre-set) screen in accordance with the present invention.

A user may have the ability to send text, audio, graphics or video messages between locations. On Messages sending screen 340 of FIG. 29, the user may use data input device 140 (FIG. 10) to type a text message in the message entry section 343. Alternately the user may enter audio messages through, for example, using a microphone as a data input device or video with a camera device. The user can select which location to send the message to by moving highlight region 341 to location option 342 (which may be the children's room). For example, a parent in the downstairs master bedroom may send a message telling the child in the upstairs bedroom to come down for dinner or to do their homework. Messages sending screen 379 of FIG. 30 may provide the user with an opportunity to select from pre-existing text messages 380. Pre-existing messages 380 may have been previously stored by a user or pre-set by the manufacturer. Messages may be transmitted between program guides at different locations within the household using any suitable communications technique such as e-mail protocols or any method described in connection with the above discussion of various topologies.

Figure 33:
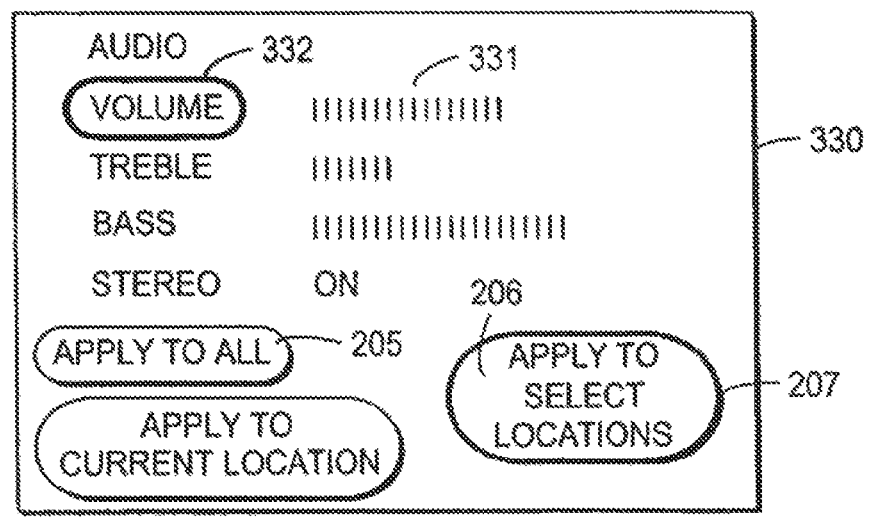
FIG. 33 is a depiction of an illustrative setup audio screen in accordance with the present invention.

The program guide system may also provide the user with an opportunity to set device control options. For example, the user may access main screen 170 of FIG. 12, and use remote control 54 to choose the setup option 179 by using the remote control 54 to scroll to the setup option 179 and pressing the enter button. The user can then select audio option 312 on setup screen 310 of FIG. 31 by moving highlight region 313 and pressing the enter button. Next, on the setup audio screen 330 of FIG. 33, the user may move highlight region 332 to set volume option 331. The user may use remote control 54 to adjust the volume upwards or downwards. For example, parents may wish to turn down the volume on the kids television. The user may choose to apply the adjustments made on screen 330 to all locations by selecting apply to all option 205, to the current location by selecting apply to current location option 209, or may choose to apply adjustments to a specific location or locations by selecting the select locations option 206. Alternatively, the guide may apply the settings to a default location or to a location determined by other factors as described above.

Figure 32:
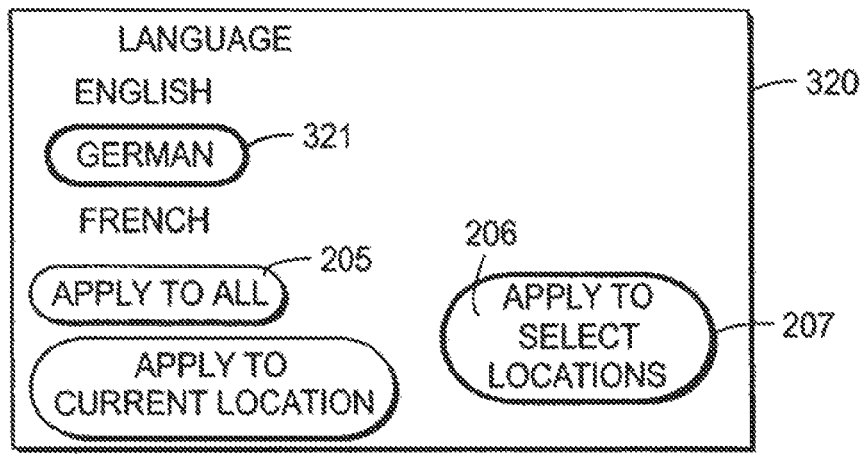
FIG. 32 is a depiction of an illustrative setup language screen in accordance with the present invention.

Another program guide option that may be coordinated within the household is an option for selecting languages. From setup screen 310 of FIG. 31, the user may also select language option 311 by moving highlight region 313 and pressing the enter button. On setup language screen 320 of FIG. 32 or other such screen, the user may move highlight region 321 to select a language (which may be German). The user may use remote control 54 to select the chosen language. The user may choose to apply the adjustments to all locations by selecting apply to all option 205, choose to apply adjustments to a specific location or locations by selecting the select locations option 206, or choose to apply to the current location by selecting current location option 209. Alternatively, the guide may apply the settings to a default location or to a location determined by other factors as described above. The selected language may be used by the program guide when displaying program guide screens that contain text or audio, as described in Ellis et al. U.S. patent application Ser. No. 09/354,602, filed concurrently herewith, which is hereby incorporated by reference herein in its entirety.

Other device options, such as, video option 314 and closed-captioning (CC) option 315 may be set from screen 310 of FIG. 31. After the user has chosen a location to which the settings may be applied, the user may name the location by selecting name location option 317.

Data files may be used to transmit program guide settings. When a particular program guide retrieves program guide settings adjustments for the user, this data may be transmitted to the central facility or to another program guide via the return path in a two-way cable link, via modem link, or via any other suitable communications path. The settings may be stored at a server or on any on of the program guides in a household. For example, in the configuration of FIG. 3, program guide settings adjustments collected at secondary user television equipment 61, may be stored at primary user television equipment 60. Similarly, set top box 90 of FIG. 6 may store program guide settings for televisions 92, 94, 96, and 98. In the configuration of FIGS. 4a, 4b, and 4c, program guide settings adjustments collected at user television equipment 66 may be stored at any one of user television equipment devices 66, 67, 68, or 69. In the configuration of FIGS. 7a and 7b, program guide settings that are shared such as family reminders may be stored on any one of servers 56, server 105, or server 42. Program guide settings may be transmitted periodically or when a data transfer is requested by a particular piece of user television equipment or the central facility. Certain communications protocols may be particularly suitable for certain topologies of user television equipment devices. For example, if the user television equipment devices are arranged in a ring topology, a token ring communications protocol may be used to interconnect the program guides. A bus protocol may be used for a bus topology, etc. An advantage of using an in home network is sharing of data among devices within the home. For example, a listing may be stored on only one device, freeing space for other settings to be stored on other devices.

Messaging information may be transmitted to or from the central facility via the return path in a two-way cable link, via modem link, or via any other suitable communications path. The type of message may determine where the message is stored. Messages sent by the central facility may generally be stored at the central facility. Messages generated by a user may be stored at the user television equipment that stores the user's other program guide settings.

The discussion thus far has focused on implementing the invention with an interactive television program guide. The invention may also be applied to non-program-guide applications. These non-program-guide applications run on user television equipment such as a set-top box. For example, an Internet browser may be run on a set-top box connected to a television. Internet application settings can be coordinated among televisions and/or set-top boxes within a household in the same way that program guide settings are coordinated among program guides in the house.

Figure 34:
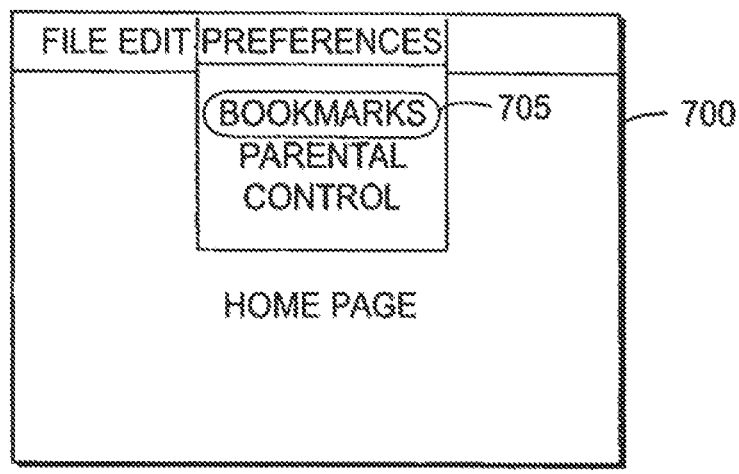
FIG. 34 is a depiction of an illustrative Internet browser screen in accordance with the present invention.

One non-program-guide application that may be implemented in accordance with the present invention is an Internet browser. An Internet browser may have settings such as bookmarks, parental control settings, and general preferences that control how the browser functions. As shown in FIG. 34, a browser application screen 700, may have a bookmark option 705. After adding a bookmark, the system allows the bookmark and other settings to be effective on other locations in the household. For example, a user may select bookmark option 705 and add a bookmark (i.e., a record of the address of the current web site that can be used to access the site). Through a network, in accordance with the present invention, the application can make the bookmark effective on other locations in the household. Accordingly, the user can choose to apply settings adjustments to all locations by selecting an apply to all option or may opt to apply the adjustments to a specific location or locations by selecting a select locations option from the options provided by the program guide. The guide may apply the settings to a default location or to a location determined by other factors as described above.

Figure 35:
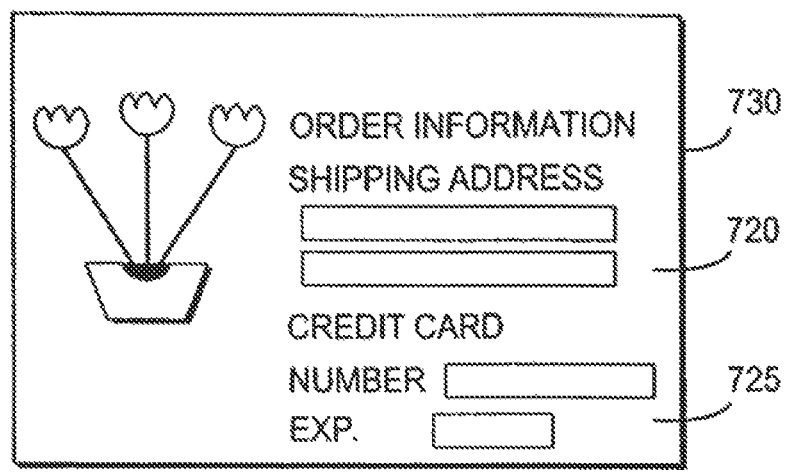
FIG. 35 is a depiction of an illustrative shopping data entry screen in accordance with the present invention.

Another application that may be implemented in accordance with the present invention is an shopping application. A shopping application may have settings such as a default shipping address, and credit card number. As shown in FIG. 35, a shopping application screen 730, has settings such as a shipping address 720, and credit card number 725. After adding a shipping and credit card information, the system allows the shipping address, credit card number and other, settings to be effective on other locations in the household. For example, a user can add a shipping address. Through a network, in accordance with the present invention, the application can make the shipping address effective on other locations in the household. Accordingly, the user can choose to apply settings adjustments to all locations by selecting an apply to all option or may opt to apply the adjustments to a specific location or locations by selecting a select locations option from the options provided by the program guide. The guide may apply the settings to a default location or to a location determined by other factors as described above.

Figure 36:
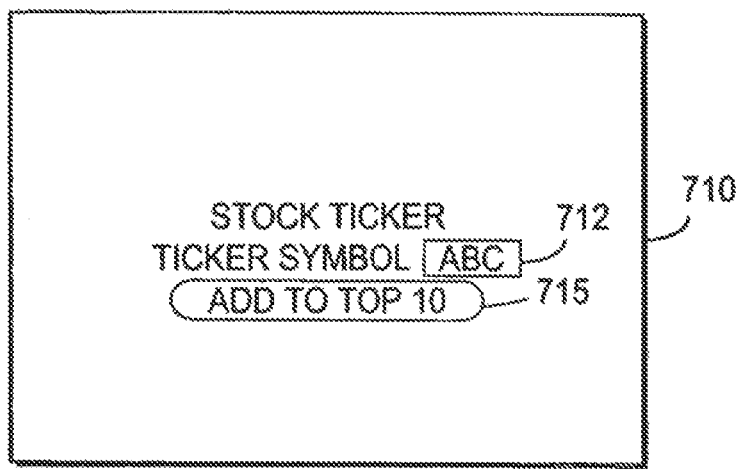
FIG. 36 is a depiction of an illustrative stock ticker data entry screen in accordance with the present invention.

Another non-program-guide application that may be implemented on user television equipment and coordinated with other such applications in accordance with the present invention is a stock ticker. A stock ticker may have settings such as settings indicating the top 10 stocks in which the user is interested. As shown in FIG. 36, a stock ticker settings screen 710 has a ticker symbol 712 and a top 10 stocks option 715. For example, a user may add a top stock. Then, through a network, in accordance with the present invention, the application can make the top 10 stock settings effective on other locations in the household. Accordingly, the user can choose to apply the adjustments to all locations by selecting an apply to all option or may opt to apply the adjustments to a specific location or locations by selecting a select locations option from the options provided by the program guide. The guide may apply the settings to a default location or to a location determined by other factors as described above.

A chat application may be implemented on user television equipment such as a set top box. Chat applications are services that allow users to exchange chat messages with other users in real time. A chat application may be implemented as a stand-alone chat application or as part of another application such as a program guide application. A user may adjust settings associated with a chat application such as the size of a chat window or whether to filter potentially offensive messages. Chat applications that may be implemented on user television equipment are described in McKissick et al. U.S. patent application Ser. No. 09/356,270, filed concurrently herewith, which is hereby incorporated by reference herein in its entirety. After the user adjusts chat settings, the user can choose to apply the chat settings adjustments to all locations by selecting an apply to all option or may opt to apply the adjustments to a specific location or locations by selecting a select locations option. Settings may be coordinated between the chat applications using options provided by the chat application. The chat application may apply the settings to a default location or to a location determined by other factors as described above.

If desired, the settings of an e-mail application running on different user television equipment devices in the household may be coordinated. When the user adjusts the e-mail settings associated with one user television equipment device, the system coordinates the operation of the other e-mail applications so that the adjusted e-mail settings may be used by the other e-mail applications.

The foregoing is merely illustrative of the principles of this invention and various modifications can be made by those skilled in the art without departing from the scope and spirit of the invention.

What is claimed is:

1. A method for using an interactive program guide system based on first and second user equipment devices located in a single household, wherein the first and second user equipment devices are interconnected by a communications path, the method comprising:

generating for display, with a first interactive program guide implemented on the first user equipment device, an option for recording a program by a second interactive program guide implemented on the second user equipment device, wherein:
the first and second user equipment devices are located at first and second locations within the household respectively; and
the first interactive program guide is interactive independently of the second interactive program guide;
receiving, with the first interactive program guide a user selection of the displayed option to record the program;
in response to receiving the user selection, determining which of the first and second user equipment devices includes a recording device; and
in response to receiving the user selection and in response to determining that the second user equipment device includes the recording device, directing over the communications path, using the first interactive program guide, the second interactive program guide to schedule for recording the program selected with the first interactive program guide;
wherein instructions from the second interactive program guide are provided to the recording device in the second user equipment device to record the program selected with the first interactive program guide.

2. The method of claim 1, wherein the recording device is at least one of a videocassette recorder and a personal video recorder.

3. The method of claim 1, wherein the first and second interactive program guides are each configured to independently generate a display of a plurality of program listings.

4. The method of claim 3, wherein receiving a user selection comprises receiving a selection of one of the plurality of program listings.

5. The method of claim 1, further comprising allowing the user to select the second location from the first location.

6. The method of claim 1, wherein one of the first and second user equipment devices comprises a set-top box and at least a television and the other one of the first and second user equipment devices comprises a television but not a set-top box.

7. The method of claim 6, wherein the set-top box comprises an embedded hard disk and wherein recording the selected program comprises using the hard disk.

8. The method of claim 1, wherein the selected program is recorded at a future time.

9. The method of claim 1, wherein the selected program comprises a series of programs.

10. The method of claim 1, wherein the first user equipment device is configured to output to a first display and the second user equipment device is configured to output to a second display.

11. The method of claim 1, wherein a display of the first interactive program guide is generated by the first interactive program guide based on program guide information received by the first user equipment device, from a data provider, independently from the second user equipment device.

12. The method of claim 1, further comprising:
generating for display, with the first interactive program guide, simultaneous indications of:
a program selected for recording using the second interactive program guide; and
the program selected with the first interactive program guide.

13. The method of claim 1, wherein the second interactive program guide is directed to schedule for recording the program selected with the first interactive program guide in response to determining that the first user equipment device does not include a recording device.

14. An interactive program guide system based on first and second user equipment devices located in a single household, wherein the first and second user equipment devices are interconnected by a communications path, the system comprising:
a first interactive program guide implemented on the first user equipment device,
wherein the first program guide is configured to:
generate a display of an option for recording a program by a second interactive program guide implemented on the second user equipment device;
receive a user selection of the displayed option to record the program;
in response to receiving the user selection, determine which of the first and second user equipment devices includes a recording device; and
in response to receiving the user selection and in response to determining that the second user equipment device includes the recording device, direct, over the communications path, the second interactive program guide to schedule for recording the program selected with the first interactive program guide;
wherein the second interactive program guide is configured to provide instructions to the recording device in the second user equipment device to record the program selected with the first interactive program guide;
wherein the first and second user equipment devices are located at first and second locations within the household respectively; and
wherein the first interactive program guide is interactive independently of the second interactive program guide.

15. The system of claim 14, wherein the recording device is at least one of a videocassette recorder and a personal video recorder.

16. The system of claim 14, wherein the first and second interactive program guides are each configured to independently generate a display of a plurality of program listings.

17. The system of claim 16, wherein receiving a user selection comprises receiving a selection of one of the plurality of program listings.

18. The system of claim 14, wherein the first interactive program guide is configured to allow the user to select the second location from the first location.

19. The system of claim 14, wherein one of the first and second user equipment devices comprises a set-top box and at least a television and the other one of the first and second user equipment devices comprises a television but not a set-top box.

20. The system of claim 19, wherein the set-top box comprises an embedded hard disk and wherein the second user equipment device is configured to record the selected program using the hard disk.

21. The system of claim 14, wherein the selected program is recorded at a future time.

22. The system of claim 14, wherein the selected program comprises a series of programs.

23. The system of claim 14, wherein a display of the first interactive program guide is generated by the first interactive program guide based on program guide information received by the first user equipment device, from a data provider, independently from the second user equipment device.

24. The system of claim 14, wherein the first interactive program guide generates, for display, simultaneous indications of:
a program selected for recording using the second interactive program guide; and
the program selected with the first interactive program guide.

25. The system of claim 14, wherein the second interactive program guide is directed to schedule for recording the program selected with the first interactive program guide in response to determining that the first user equipment device does not include a recording device.

26. Non-transitory computer readable media for using an interactive program guide system based on first and second user equipment devices located in a single household, wherein the first and second user equipment devices are interconnected by a communications path and wherein the second user equipment device comprises a recording device, the non-transitory computer readable media comprising non-transitory computer readable instructions encoded thereon for:
generating for display, with a first interactive program guide implemented on the first user equipment device, an option for recording a program by a second interactive program guide implemented on the second user equipment device, wherein:
the first and second user equipment devices are located at first and second locations within the household respectively; and the first interactive program guide is interactive independently of the second interactive program guide;

receiving, with the first interactive program guide a user selection of the displayed option to record the program;

in response to receiving the user selection, determining which of the first and second user equipment devices includes a recording device; and in response to receiving the user selection and in response to determining that the second user equipment device includes the recording device, directing over the communications path, using the first interactive program guide, the second interactive program guide to schedule for recording the program selected with the first interactive program guide;

wherein instructions from the second interactive program guide are provided to the recording device in the second user equipment device to record the program selected with the first interactive program guide.

27. The non-transitory computer readable media of claim 26, wherein the recording device is at least one of a videocassette recorder and a personal video recorder.

28. The non-transitory computer readable media of claim 26, wherein the first and second interactive program guides are each configured to independently generate a display of a plurality of program listings.

29. The non-transitory computer readable media of claim 28, wherein receiving a user selection comprises receiving a selection of one of the plurality of program listings.

30. The non-transitory computer readable media of claim 26, further comprising non-transitory computer readable instructions recorded thereon for allowing the user to select the second location from the first location.

31. The non-transitory computer readable media of claim 26, wherein one of the first and second user equipment devices comprises a set-top box and at least a television and the other one of the first and second user television equipment devices comprises a television but not a set-top box.

32. The non-transitory computer readable media of claim 31, wherein the set-top box comprises an embedded hard disk and wherein recording the selected program comprises using the hard disk.

33. The non-transitory computer readable media of claim 26, wherein the selected program is recorded at a future time.

34. The non-transitory computer readable media of claim 26, wherein the selected program comprises a series of programs.

35. The non-transitory computer readable media of claim 26, further comprising non-transitory computer readable instructions recorded thereon for generating for display, with the first interactive program guide, simultaneous indications of:

a program selected for recording using the second interactive program guide; and the program selected with the first interactive program guide.

36. The non-transitory computer readable media of claim 26, wherein the second interactive program guide is directed to schedule for recording the program selected with the first interactive program guide in response to determining that the first user equipment device does not include a recording device.

* * * * *